(12) United States Patent
Yuki et al.

(10) Patent No.: US 10,994,758 B2
(45) Date of Patent: May 4, 2021

(54) TRANSPORTATION MANAGEMENT SYSTEM FOR RAILWAY TRANSPORTATION OF LNG TANK CONTAINERS AND TRANSPORTATION MANAGEMENT DEVICE

(71) Applicant: Japan Petroleum Exploration Co., Ltd., Tokyo (JP)

(72) Inventors: Momoyo Yuki, Tokyo (JP); Akihisa Takahashi, Tokyo (JP); Masao Toyosaki, Tokyo (JP); Takehito Tsuji, Tokyo (JP); Makoto Ozaki, Tokyo (JP)

(73) Assignee: JAPAN PETROLEUM EXPLORATION CO., LTD., Tokyo (JP)

( * ) Notice: Subject to any disclaimer, the term of this patent is extended or adjusted under 35 U.S.C. 154(b) by 0 days.

(21) Appl. No.: 16/641,818

(22) PCT Filed: Aug. 31, 2017

(86) PCT No.: PCT/JP2017/031358
§ 371 (c)(1),
(2) Date: Feb. 25, 2020

(87) PCT Pub. No.: WO2019/043868
PCT Pub. Date: Mar. 7, 2019

(65) Prior Publication Data
US 2020/0247440 A1 Aug. 6, 2020

(51) Int. Cl.
*B61L 15/00* (2006.01)
*B60P 3/22* (2006.01)

(52) U.S. Cl.
CPC .......... *B61L 15/0081* (2013.01); *B60P 3/228* (2013.01); *B60P 3/2285* (2013.01); *B61L 15/0027* (2013.01)

(58) Field of Classification Search
CPC ............. B61L 15/0018; B61L 15/0027; B61L 15/0081; B61L 15/009; B60P 3/228; F17C 2270/0173; F17C 2221/033; G08B 21/182
See application file for complete search history.

(56) References Cited

U.S. PATENT DOCUMENTS

| 4,041,470 A | * | 8/1977 | Slane | ........................ | B60L 3/12 |
| | | | | | 701/29.1 |
| 5,305,237 A | * | 4/1994 | Dalrymple | ............ | G01F 23/284 |
| | | | | | 324/644 |

(Continued)

FOREIGN PATENT DOCUMENTS

| CN | 103532874 A | 1/2014 |
| JP | 2005-234815 A | 9/2005 |

(Continued)

OTHER PUBLICATIONS

Int'l Search Report dated Nov. 21, 2017 in Int'l Application No. PCT/JP2017/031358.

(Continued)

*Primary Examiner* — Andrew W Bee
(74) *Attorney, Agent, or Firm* — Panitch Schwarze Belisario & Nadel LLP

(57) ABSTRACT

A transportation management system for a tank container allowed to be placed on a container freight car, the tank container including a vessel capable of accommodating liquefied natural gas and a frame body which supports the vessel, the transportation management system includes a vessel management device and a transportation management device to communicate with the vessel management device. The vessel management device includes a vessel information detection unit to detect vessel information of the vessel included in the tank container, and a vessel management device-side communication unit to transmit the vessel infor- (Continued)

mation detected by the vessel information detection unit to the transportation management device. The transportation management device includes a transportation management device-side communication unit to receive the vessel information from the vessel management device, and an output control unit to output warning information based on the vessel information received from the vessel management device, to an output unit.

9 Claims, 13 Drawing Sheets

(56) References Cited

U.S. PATENT DOCUMENTS

| | | | |
|---|---|---|---|
| 2012/0181390 A1* | 7/2012 | Ashraf | B61L 29/22 246/122 R |
| 2016/0068170 A1* | 3/2016 | Cook | F17C 13/08 312/293.3 |

FOREIGN PATENT DOCUMENTS

| | | | |
|---|---|---|---|
| JP | 2013-097601 A | | 5/2013 |
| JP | 2013097601 A | * | 5/2013 |
| JP | 2015-085876 A | | 5/2015 |
| JP | 2015-187857 A | | 10/2015 |

OTHER PUBLICATIONS

Notice of Allowance dated Feb. 26, 2019 in JP Application No. 2018-567966.

* cited by examiner

TRANSPORTATION MANAGEMENT SYSTEM FOR RAILWAY TRANSPORTATION OF LNG TANK CONTAINERS AND TRANSPORTATION MANAGEMENT DEVICE

CROSS-REFERENCE TO RELATED APPLICATION

This application is a Section 371 of International Application No. PCT/JP2017/031358, filed Aug. 31, 2017, which was published in the Japanese language on Mar. 7, 2019 under International Publication No. WO 2019/043868 A1, the disclosure of which is incorporated herein by reference in its entirety.

TECHNICAL FIELD

The present invention relates to a transportation management system for railway transportation of LNG tank containers and a transportation management device.

BACKGROUND ART

In recent years, interests of developing countries on the use of a natural gas which is clean and cheaper than oil increase. In the related art, pipelines or lorry trucks are used for gas transportation. However, in developing countries in which the infrastructure is lack, laying long-distance pipelines and long-distance transportation roads, which require negotiations with many landowners are not easy and hinder the promotion of gas use. However, the railway network is well developed in the developing countries. For this reason, if a liquefied natural gas (LNG) can be transported by rail, individual customers can use the gas without the need for long-distance pipelines or long-distance transportation roads.

In order to safely transport the LNG by rail in developing countries, it is necessary to assume situations, for example, in which collection of an LNG tank container is forgotten, mistakes in collecting the LNG tank container occur, the LNG tank container is stolen, or delays in railways occur significantly. Thus, it is necessary to establish a management method for handling such situations. For such reasons, research and development of technologies related to LNG transportation are being performed.

In this regard, a monitoring system of monitoring a tank container in which the LNG is accommodated among tank containers transported by a railway vehicle (refer to Patent Document 1 as mentioned below).

CITATION LIST

Patent Document

Patent Document 1: Chinese Patent No. 103532874

DISCLOSURE OF INVENTION

Technical Problem

Such a monitoring system includes an instrument and a receiving device. The instrument detects information regarding contents of a tank container in which an LNG is accommodated and transmits the detected information to the receiving device. The receiving device stores the information received from the instrument, in a storage unit. However, in the monitoring system, although a change in information regarding the contents of the tank container is stored, it is not specifically considered to perform processing in accordance with the information. Therefore, in the monitoring system, in a case where, when the tank container is transported by a railroad vehicle, a problem occurs in the state of the tank container, the tank container may be left without being treated for solving the problem.

The present invention provides a transportation management system and a transportation management device, in which it is possible to output warning information in accordance with vessel information regarding a vessel included in a tank container.

Solution to Problem

According to a first aspect of the present invention, a transportation management system for a tank container which is allowed to be placed on a container freight car is applied, wherein the tank container including a vessel which is capable of accommodating liquefied natural gas and a frame body which supports the vessel. The transportation management system includes a vessel management device and a transportation management device to communicate with the vessel management device. The vessel management device includes a vessel information detection unit which is configured to detect vessel information of the vessel included in the tank container, and a vessel management device-side communication unit which is configured to transmit the vessel information detected by the vessel information detection unit to the transportation management device. Also, the transportation management device includes a transportation management device-side communication unit which is configured to receive the vessel information from the vessel management device, and an output control unit which is configured to output warning information based on the vessel information received from the vessel management device, to an output unit.

According to variable options of the first aspect of the present invention, in the transportation management system, it may be used such that the output unit includes a display unit, container-freight car position information indicating a position of the container freight car is displayed on the display unit, and the output control unit is configured to display the warning information on the display unit based on the vessel information received from the vessel management device, wherein a display state of the container-freight car position information displayed on the display unit is changed in accordance with the vessel information.

According to variable options of the first aspect of the present invention, in the transportation management system, it may be used such that the container freight car is one of a plurality of freight cars pulled by a locomotive, and the container-freight car position information is information indicating the position of the container freight car in the plurality of freight cars pulled by the locomotive.

According to variable options of the first aspect of the present invention, in the transportation management system, it may be used such that the output unit includes a sound output unit, and the output control unit is configured to output a warning sound as the warning information to the sound output unit.

According to variable options of the first aspect of the present invention, in the transportation management system, it may be used such that the output control unit is configured to change the warning information to be output to the output unit, in stages, in accordance with a relation between the vessel information received by the transportation management device and a plurality of predetermined output conditions.

According to variable options of the first aspect of the present invention, in the transportation management system, it may be used such that the vessel information detection unit includes a pressure detection unit that is configured to detect pressure in the vessel, and the vessel information includes pressure information indicating the pressure detected by the pressure detection unit.

According to variable options of the first aspect of the present invention, in the transportation management system, it may be used such that the vessel information detection unit includes a position detection unit that is configured to detect a current position of the vessel, and the vessel information includes position information indicating the current position detected by the position detection unit.

According to variable options of the first aspect of the present invention, in the transportation management system, it may be used such that the vessel management device-side communication unit and the transportation management device-side communication unit communicate with each other by at least one of a mobile phone communication network and a track circuit communication network.

According to variable options of the first aspect of the present invention, in the transportation management system, it may be used such that at least a part of portions in the vessel management device is driven with power generated by photovoltaic power generation.

According to a second aspect of the present invention, a transportation management device for communicating with a vessel management device including a vessel information detection unit which is configured to detect vessel information of the vessel included in a tank container and a vessel management device-side communication unit which is configured to transmit the vessel information detected by the vessel information detection unit, wherein the tank container is allowed to be placed on a container freight car, and includes a vessel which is capable of accommodating liquefied natural gas and a frame body which supports the vessel. The transportation management device includes a transportation management device-side communication unit which is configured to receive the vessel information from the vessel management device-side communication unit; and an output control unit which is configured to output warning information based on the vessel information received from the vessel management device, to an output unit.

According to an option of the second aspect of the present invention, in the transportation management device, it may be used such that the output control unit generates a graph representing a change of pressure of the vessel with a change of time based on the vessel information and displays an image of the generated graph on a display unit included in the output unit.

Advantageous Effects of Invention

According to an aspect of the present invention, there are provided a transportation management system and a transportation management device, in which it is possible to output warning information in accordance with vessel information regarding a vessel included in a tank container.

BEST MODE FOR CARRYING OUT THE INVENTION

Embodiment

Figure 1:
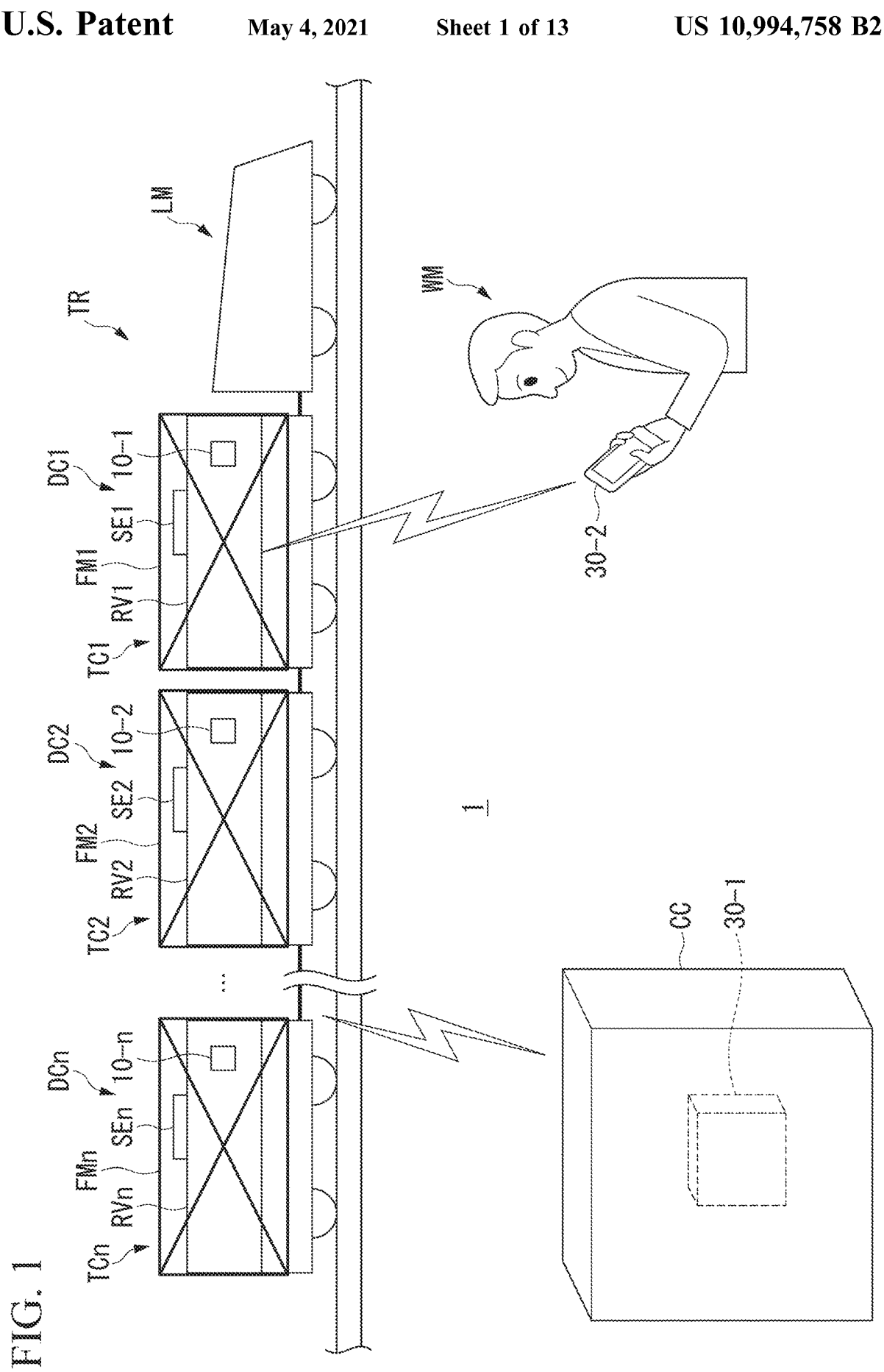
FIG. 1 is a diagram showing an example of a configuration of a transportation management system 1.

Hereinafter, an embodiment of the present invention will be described with reference to the drawings.

<Outline of Transportation Management System>

Firstly, the background of a transportation management system 1 according to the embodiment will be described.

An LNG tank container is filled with an LNG. An outer frame made of steel is attached to the LNG tank container for easy handling. The filled LNG tank container is firstly installed on a loading platform of a trailer and transported to the nearest railway station (simply referred to as the nearest station below).

The LNG tank container that has arrived at the nearest station is unloaded from the trailer mount by a top lifter, and then is transferred onto a railway transportation platform. After all LNG tank containers are transferred onto the railway transportation platform, an LNG tank container group is transported to the nearest station of each demand source by railway transportation.

The LNG tank container that has arrived at the nearest station of the demand source is again unloaded from the railway transportation platform by a top lifter and transferred onto a platform of a trailer. The LNG tank container placed on the platform of the trailer is delivered to the demand source by the shortest road transportation from the nearest station, and an LNG in the LNG tank container is transferred to an LNG tank at the demand source. The empty LNG tank container is filled with an LNG again by sequentially passing through trailer transportation, railway transportation, and trailer transportation, in a manner similar to that in the forward path.

Since railway transportation of the LNG is performed, it is possible to rapidly supply a gas to a customer only by using existing LNG lorry shipping bases and a railway network without investing in pipelines and transportation roads with large scale and long-term construction.

However, when railway transportation of an LNG according to the present invention is developed in developing countries, it is necessary to consider situations in which delays in railways occur significantly, the LNG tank container filled with an LNG is left, collection of an LNG tank container is forgotten, or the LNG tank container is stolen.

One of problems caused by leaving the filled LNG tank container or making a mistake in collecting the LNG tank container is that an increase of a vaporized gas in the LNG tank container may open a safety valve and thus cause gas emission. Gas emission is not favorable from a viewpoint of emitting CH4 having a global warming effect much higher than that of CO2. Further, if the emitted gas is ignited by some kind of fire, this may lead to an accident such as an explosion. Therefore, it is necessary to perform management not to cause emission.

Next, the outline of the transportation management system 1 according to the embodiment will be described based on the above background.

In the transportation management system 1 according to the embodiment, pressure data from a pressure gauge in an LNG tank container is transmitted via a mobile phone communication network or the like, and thus pressure in the LNG tank container is regularly monitored. An alarm is issued in stages at a time point at which signs such as an increase in abnormal pressure are observed, and many people are allowed to view the signs on a screen of a tablet personal computer (PC), a multifunctional portable phone terminal (smartphone), or a PC. Thus, it is possible to enable on-site workers and management staff to take countermeasures at an early stage.

In the transportation management system 1, data from a liquid level gauge in the LNG tank container is transmitted via a telephone communication network, and thus the LNG tank container (that is, empty LNG tank container) in which a liquid level in the LNG tank container is low can be distinguished from the filled LNG tank container by colors on a screen of the tablet personal computer (PC), the multifunctional portable phone terminal (smartphone), or the PC. Thus, the empty LNG tank container is collected thoroughly, and confusion with the filled LNG tank container is prevented.

In the transportation management system 1, since a global positioning system (GPS) attached to all LNG tank containers transmits position information via the telephone communication network, it is easy to find an occurrence of beings stolen, and it is possible to recognize an LNG tank container and a customer to which the LNG tank container is delivered, recognize an LNG tank container and a station at which the LNG tank container is transferred to a trailer, and recognize whether a problem does not occur in a transferring work, on a screen of the tablet personal computer (PC), the multifunctional portable phone terminal (smartphone), or the PC. In a case where a work in accordance with pre-input procedures from an LNG base to a customer site is not performed, an alarm is issued on the screen to notify the worker of the mistake, and thus making a mistake in work is prevented.

In the transportation management system 1, the GPS or a communication unit of the vessel management device is capable of driving with power obtained by a photovoltaic panel or power supplied from a storage battery. Thus, it is possible to perform continuous monitoring.

In an aspect of the embodiment, in the transportation management system 1, the GPS and the communication unit of the vessel management device capable of driving with power obtained by a photovoltaic panel or power supplied from a storage battery is attached to an LNG tank container so as to perform remote monitoring. Thus, it is possible to prevent accidents by theft of the LNG tank container, delay in delivery of the LNG tank container, leaving the LNG tank container, and the like, and emergency emission of a vaporized gas, in advance. In the present invention, since the GPS and the communication unit of the vessel management device are capable of driving with power obtained by the photovoltaic panel or power supplied from the storage battery, it is possible to continuously monitor the state of the LNG tank container and to predict pressure when the LNG tank container arrives at the demand source, from a monitoring result. Thus, it is also possible to optimize the preparation for preventing excessive vaporized gas generation in the receiving LNG tank, in advance. If operation data is continuously accumulated, a manner allowing a railway or a trailer to travel to perform transportation with most efficiency can be obtained by data analysis, and it is considered that the accumulated data contributes to the research of a transportation method of suppressing the generation of CO2.

The more specific outline of the transportation management system 1 according to the embodiment will be described below.

The transportation management system 1 manages transportation of an LNG by a railway vehicle. More specifically, the transportation management system 1 detects vessel information regarding a vessel in a tank container which is allowed to be placed on a container freight car and includes the vessel capable of accommodating an LNG and a frame body that accommodates the vessel. Then, the transportation management system 1 performs processing in accordance with the detected vessel information.

Here, a transportation management system (for example, transportation management system in the related art) X different from the transportation management system 1 stores a change of vessel information regarding contents of a vessel in which an LNG is accommodated, but does not specifically consider to perform processing in accordance with the information. Therefore, in the transportation management system X, even though, when a vessel is transported by a railway vehicle, pressure in the vessel is equal to or greater than a predetermined threshold, a tank container may be left as it is, without performing measures for suppressing an increase of pressure in the tank container. As a result, in the transportation management system X, the safety valve of the vessel may open, and thus the LNG in the vessel may be discharged. The threshold indicates pressure determined in accordance with pressure at which the safety valve of the vessel starts to open. For example, the threshold corresponds to pressure of about 80% of the above pressure.

The transportation management system 1 includes a vessel management device 10 and a transportation management device 30 that communicates with the vessel management device 10. The vessel management device 10 detects vessel information regarding a vessel in a tank container allowed to be placed on a container freight car. The container freight car includes the vessel capable of accommodating an LNG and a frame body supporting the vessel. Then, the vessel management device 10 transmits the detected vessel information to the transportation management device 30. The transportation management device 30 receives the vessel information from the vessel management device 10 and outputs warning information in accordance with the received vessel information to an output unit. Thus, in the transportation management system 1, it is possible to output warning information in accordance with vessel information regarding a vessel included in a tank container. A configuration of the transportation management system 1 and processing in which the transportation management system 1 manages an LNG will be described below in detail.

<Configuration of Transportation Management System>

The configuration of the transportation management system 1 will be described below with reference to FIG. 1. FIG. 1 is a diagram showing an example of the configuration of the transportation management system 1.

In the example shown in FIG. 1, the transportation management system 1 is applied for railway transportation of an LNG by a railway vehicle TR. That is, in the following descriptions, the railway transportation means railway transportation of an LNG by the railway vehicle TR and railway transportation to which the transportation management system 1 is applied. The railway vehicle TR includes a locomotive LM and n (n is an integer of 1 or more) container freight cars DC being a container freight car DC1 to a container freight car DCn. A tank container TC is placed on each of the n container freight cars DC. The tank container TC includes a vessel RV capable of accommodating an LNG and a frame body FM that accommodates the vessel RV. The vessel management device 10 and a photovoltaic power generation device SE are attached to the vessel RV. The photovoltaic power generation device SE supplies power to at least a part of portions in the vessel management device 10. For easy descriptions, the following descriptions will be made on the assumption that the tank container TC, the vessel RV, the frame body FM, the vessel management device 10, and the photovoltaic power generation devices SE placed in the m-th (that is, Car m in the railway vehicle TR) container freight car DCm are referred to as a tank container TCm, a vessel RVm, a frame body FMm, a vessel management device 10-m, and a photovoltaic power generation device SEm, respectively. Here, m is an integer which is any of 1 to n. A configuration in which the tank container TC is not placed in some of the n container freight cars DC may be made. In this case, a configuration in which a tank container different from the tank container TC is placed in the container freight car DC in which the tank container TC is not placed may be used, and a configuration in which no tank container is placed in the container freight car DC in which the tank container TC is not placed may be used. A configuration in which the photovoltaic power generation device SE is not attached to some or all of the n vessels RV. In this case, power is supplied to the vessel management device 10 attached to the vessel RV to which the photovoltaic power generation device SE is not attached, for example, through a railway line on which the locomotive LM or the railway vehicle TR travels.

The vessel management device 10-m detects vessel information RDm being vessel information RD regarding the vessel RVm to which the vessel management device 10-m is attached. The vessel management device 10-m transmits the detected vessel information RDm to the transportation management device 30. The vessel information RDm includes one or more types of information including at least pressure information among the pressure information indicating pressure in the vessel RVm, liquid level information indicating the height of a liquid level of an LNG in the vessel RVm, and position information indicating the current position of the vessel RVm. As an example, a case where the vessel information RDm includes all the pressure information, the liquid level information, and the position information will be described below. Instead of either or both the liquid level information and the position information, the vessel information RDm may include another type of information regarding the vessel RVm along with the pressure information. The vessel information RDm may include another type of information regarding the vessel RVm in addition to all the pressure information, the liquid level information, and the position information.

The transportation management device 30 receives vessel information RD from each of the one or more vessel management devices 10 (in this example, n vessel management devices 10). The transportation management device 30 outputs warning information in accordance with the vessel information RD received from the vessel management device 10, for each of the one or more vessel management devices 10. Thus, the transportation management device 30 can output the warning information in accordance with the vessel information RD regarding the vessel RV included in the tank container TC. That is, the transportation management device 30 can more appropriately manage transportation of the LNG by the railway vehicle TR, in comparison to the transportation management system X.

For example, the transportation management device 30 corresponds to a workstation, a desktop PC, a notebook PC, a tablet PC, a multifunctional mobile phone terminal (smartphone), a mobile phone terminal, a communicable e-book reader, and a personal digital assistant (PDA). A plurality of transportation management devices 30 may be provided in the transportation management system 1. In the example shown in FIG. 1, two transportation management devices 30 being a transportation management device 30-1 and a transportation management device 30-2 are provided as the transportation management device 30. The transportation management device 30-1 is installed in a building CC of a business establishment that manages transportation of an LNG by the railway vehicle TR. The transportation management device 30-2 is held by a worker WM who perform work on each container freight car DC. Here, the transportation management device 30-1 is, for example, a desktop PC. The transportation management device 30-2 is, for example, a tablet PC. As described above, in a case where the plurality of transportation management devices 30 are provided in the transportation management system 1, each of the plurality of transportation management devices 30 receives vessel information RD from each vessel management device 10. A configuration in which some of the plurality of transportation management devices 30 receive the vessel information RD from the transportation management device 30 which is different from the some of the plurality of transportation management devices 30 and has received the vessel information RD may be made. A configuration in which the some devices 30 read the vessel information RD which is stored in a server that communicates with each of the some devices and is detected by each vessel management device 10 may be made. In the example, the transportation management device 30-1 and the transportation management device 30-2 perform the same processing. Therefore, for easy descriptions, the following descriptions will be made on the assumption that the transportation management device 30-1 and the transportation management device 30-2 are collectively referred to as the transportation management device 30 so long as there is no need to distinguish the transportation management device 30-1 and the transportation management device 30-2 from each other.

The transportation management device 30-1 is connected to each vessel management device 10 by a radio communication performed via a mobile phone communication network or by a wireless communication performed by the communication standards such as Wi-Fi (registered trademark), so as to enable a communication with each vessel management device 10. The transportation management device 30-1 may be connected to each vessel management device 10 by a wired communication so as to enable a communication with each vessel management device 10. In this case, the wired communication is performed, for example, via a track circuit communication network being a communication network through a railway line (railway track circuit) on which the railway vehicle TR travels. The transportation management device 30-1 may be connected to each vessel management device 10 by both the wireless communication and the wired communication, so as to enable a communication with each vessel management device 10.

The transportation management device 30-2 is connected to each vessel management device 10 by a radio communication performed via a mobile phone communication network or by a wireless communication performed by the communication standards such as Wi-Fi (registered trademark), so as to enable a communication with each vessel management device 10. The transportation management device 30-2 may be connected to each vessel management device 10 by a wired communication so as to enable a communication with each vessel management device 10. In this case, the wired communication is performed, for example, via a track circuit communication network being a communication network through a railway line (railway track circuit) on which the railway vehicle TR travels. The transportation management device 30-2 may be connected to each vessel management device 10 by both the wireless communication and the wired communication, so as to enable a communication with each vessel management device 10.

<Hardware Configuration of Vessel Management Device>

Figure 2:
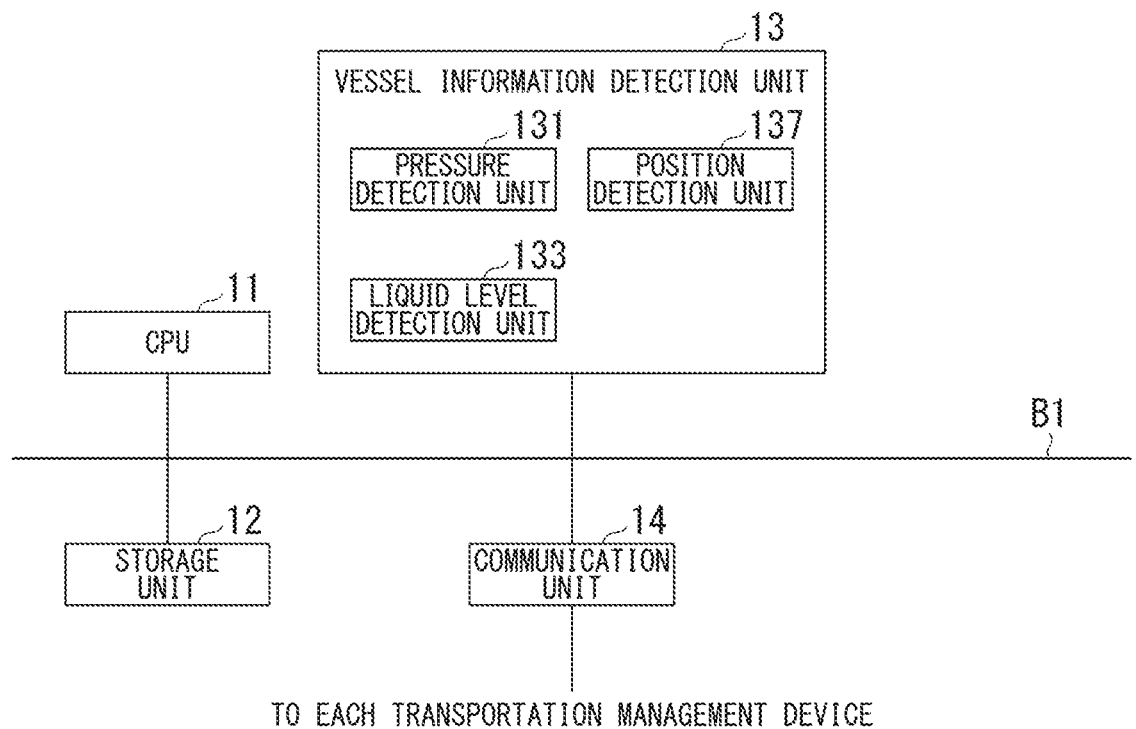
FIG. 2 is a diagram showing an example of a hardware configuration of a vessel management device 10.

A hardware configuration of the vessel management device 10 will be described below with reference to FIG. 2. FIG. 2 is a diagram showing an example of a hardware configuration of the vessel management device 10.

For example, the vessel management device 10 includes a central processing unit (CPU) 11, a storage unit 12, a vessel information detection unit 13, and a communication unit 14. The components are connected to each other via a bus B1 to enable communication with each other. The vessel management device 10 communicates with each of one or more transportation management devices 30 through the communication unit 14.

The CPU 11 executes various programs stored in the storage unit 12.

For example, the storage unit 12 includes a hard disk drive (HDD), a solid state drive (SSD), an electrically erasable programmable read-only memory (EEPROM), a read-only memory (ROM), and a random access memory (RAM). The storage unit 12 may be an external storage device which is connected by a digital input and output port such as a universal serial bus (USB) instead of a storage device mounted in the vessel management device 10. The storage unit 12 stores various kinds of information processed by the vessel management device 10, various programs, and the like.

The vessel information detection unit 13 detects vessel information RD regarding the vessel RV to which the vessel information detection unit 13 is attached. The vessel information detection unit 13 includes a pressure detection unit 131, a liquid level detection unit 133, and a position detection unit 137. The vessel information detection unit 13 may have any configuration so long as the vessel information detection unit 13 includes at least the pressure detection unit 131. That is, the vessel information detection unit 13 may have a configuration in which either or neither the liquid level detection unit 133 or the position detection unit 137 is provided.

The pressure detection unit 131 is, for example, a pressure sensor. The pressure detection unit 131 may be any sensor so long as the sensor is capable of detecting pressure in the vessel RV.

The liquid level detection unit 133 is a liquid level sensor that detects the height of the liquid level of an LNG in the vessel RV. The liquid level detection unit 133 may be any sensor so long as the sensor is capable of detecting the height of the liquid level of the LNG in the vessel RV.

The position detection unit 137 is, for example, a GPS receiver. The position detection unit 137 receives a radio wave from a GPS satellite and detects (calculates) the current position of the vessel management device 10 based on the received radio wave. The position detection unit 137 may be any device so long as the device is capable of detecting the current position. The current position may or may not include a direction to which the vessel management device is directed. As an example, a case where the direction to which the vessel management device is directed is included in the current position will be described below.

The communication unit 14 transmits various types of information to and from the transportation management device 30 in a wired or wireless manner, for example. The communication unit 14 is an example of a vessel management device-side communication unit.

<Hardware Configuration of Transportation Management Device>

Figure 3:
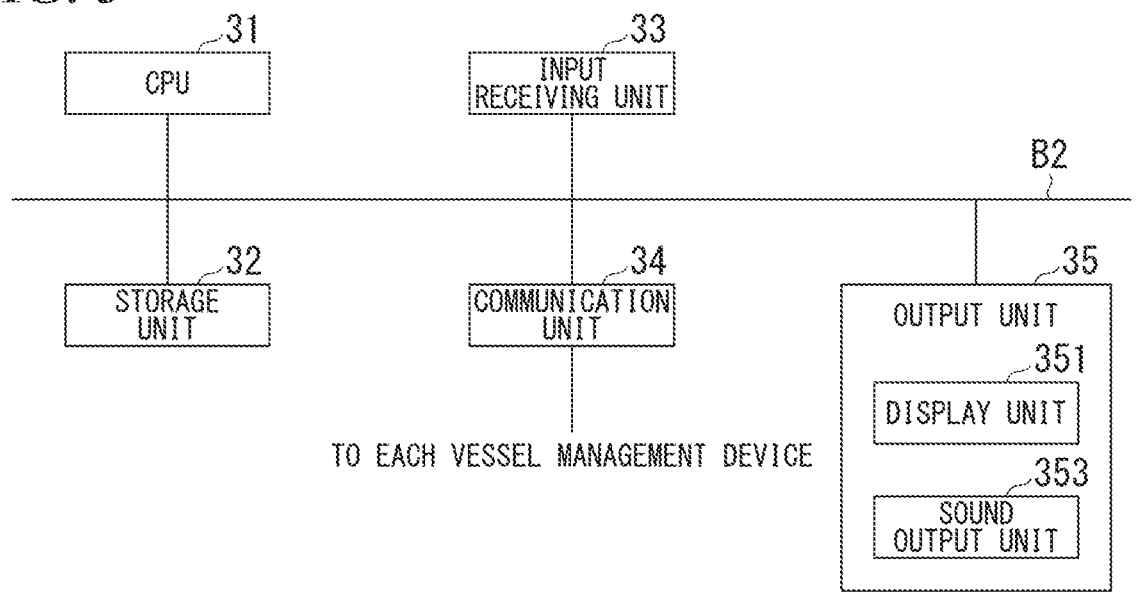
FIG. 3 is a diagram showing an example of a hardware configuration of a transportation management device 30.

A hardware configuration of the transportation management device 30 will be described below with reference to FIG. 3. FIG. 3 is a diagram showing an example of the hardware configuration of the transportation management device 30.

For example, the transportation management device 30 includes a CPU 31, a storage unit 32, an input receiving unit 33, a communication unit 34, and an output unit 35. The components are connected to each other via a bus B2 to enable communication with each other. The transportation management device 30 communicates with each of one or more vessel management devices 10 through the communication unit 34.

The CPU 31 executes various programs stored in the storage unit 32.

The storage unit 32 includes, for example, an HDD, an SSD, an EEPROM, a ROM, and a RAM. The storage unit 32 may be an external storage device which is connected by a digital input and output port such as a USB instead of a storage device mounted in the transportation management device 30. The storage unit 32 stores various kinds of information processed by the transportation management device 30, various programs, various images, and the like.

The input receiving unit 33 corresponds to, for example, a keyboard, a mouse, a touch pad, and other input devices.

Instead, the input receiving unit 33 may be a touch panel which is integrally configured with a display unit 351 described later. The input receiving unit 33 may be provided to be separate from the transportation management device 30. In this case, the input receiving unit 33 is connected to the transportation management device 30 to be allowed to communicate with the transportation management device 30 in a wired or wireless manner.

The communication unit 34 transmits various types of information to and from each vessel management device 10 in a wired or wireless manner, for example. The communication unit 34 is an example of a transportation management device-side communication unit.

The output unit 35 includes some or all of a display unit, a sound output unit, a vibrating unit, and the like. As an example, a case where the output unit 35 includes a display unit 351 as the display unit and a sound output unit 353 as the sound output unit will be described below.

The display unit 351 is, for example, a liquid crystal display panel or an organic electroluminescence (EL) display panel. The display unit 351 may be provided to be separate from the transportation management device 30. In this case, the display unit 351 is connected to the transportation management device 30 to be allowed to communicate with the transportation management device 30 in a wired or wireless manner.

The sound output unit 353 is, for example, a speaker. The sound output unit 353 may be provided to be separate from the transportation management device 30. In this case, the sound output unit 353 is connected to the transportation management device 30 to be allowed to communicate with the transportation management device 30 in a wired or wireless manner.

<Functional Configuration of Vessel Management Device and Transportation Management Device>

Figure 4:
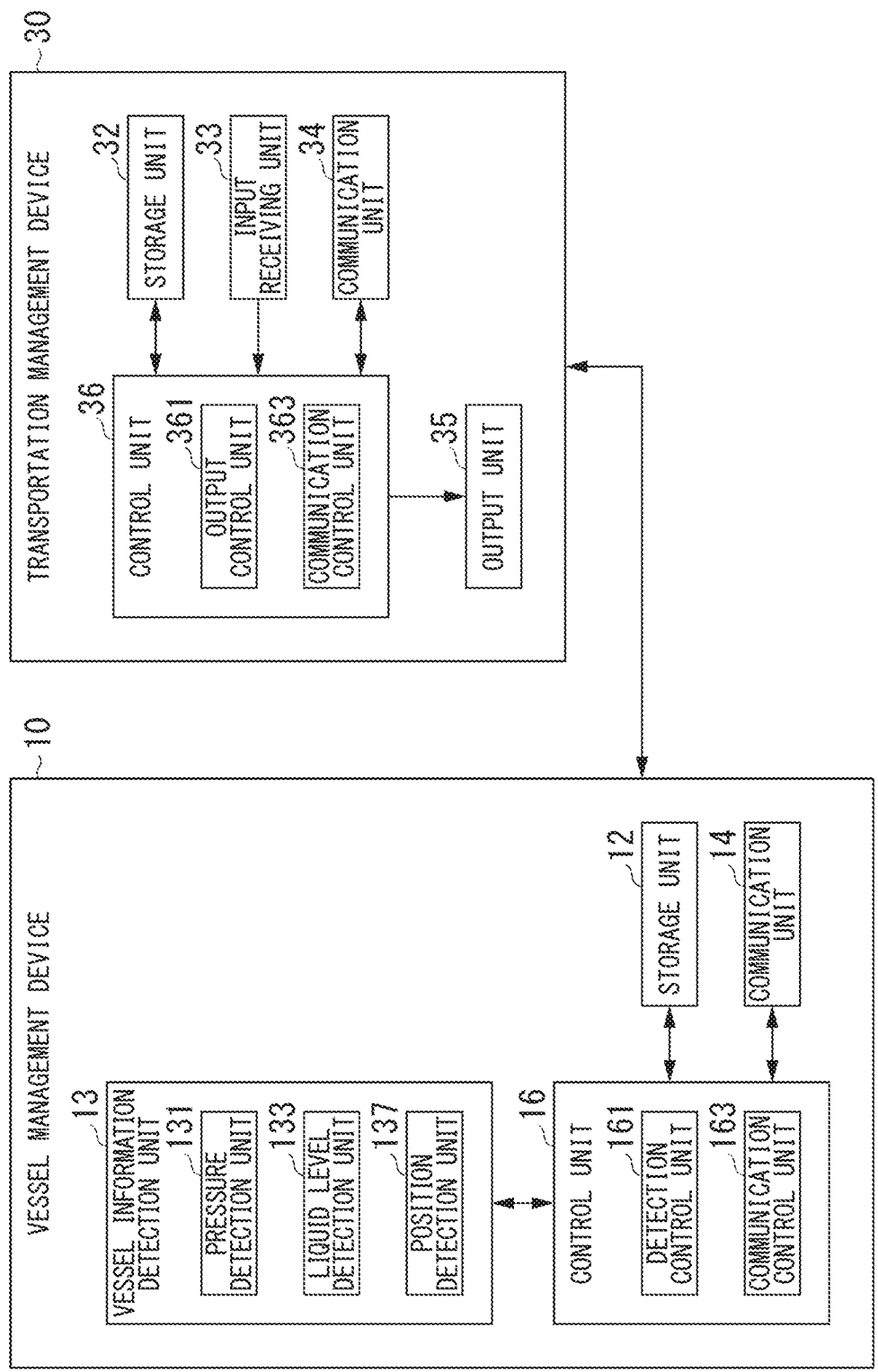
FIG. 4 is a diagram showing an example of a functional configuration of the vessel management device 10 and the transportation management device 30.

A functional configuration of the vessel management device 10 and the transportation management device 30 will be described below with reference to FIG. 4. FIG. 4 is a diagram showing an example of the functional configuration of the vessel management device 10 and the transportation management device 30.

The vessel management device 10 includes the storage unit 12, the vessel information detection unit 13, the communication unit 14, and a control unit 16.

The control unit 16 controls the entirety of the vessel management device 10. The control unit 16 includes a detection control unit 161 and a communication control unit 163. The functional units in the control unit 16 are realized, for example, by the CPU 11 executing various programs stored in the storage unit 12. Some or all of the functional units may be hardware functional units such as a large scale integration (LSI) or an application specific integrated circuit (ASIC).

When the detection control unit 161 receives a detection start request from the transportation management device 30, the detection control unit 161 causes the vessel information detection unit 13 to detect vessel information RD every time a waiting time being a predetermined time has elapsed. The detection start request is a request of causing the vessel information detection unit 13 to start detection of the vessel information RD.

The communication control unit 163 controls a communication with each of one or more transportation management devices 30 through the communication unit 14. For example, the communication control unit 163 receives the detection start request from the transportation management device 30 through the communication unit 14. For example, the communication control unit 163 transmits the vessel information RD detected by the detection control unit 161 to each of one or more transportation management devices 30 through the communication unit 14.

The transportation management device 30 includes the storage unit 32, the input receiving unit 33, the communication unit 34, the output unit 35, and a control unit 36.

The control unit 36 controls the entirety of the transportation management device 30. The control unit 36 includes an output control unit 361 and a communication control unit 363. The functional units in the control unit 36 are realized, for example, by the CPU 31 executing various programs stored in the storage unit 32. Some or all of the functional units may be hardware functional units such as an LSI or an ASIC.

The output control unit 361 outputs various types of information to the output unit 35. The various types of information correspond to, for example, various images to be displayed by the display unit 351. When the output control unit 361 generates an image, the output control unit 361 displays the generated image on the display unit 351. For example, the various types of information correspond to various sounds to be output from the sound output unit 353. When the output control unit 361 generates a sound, the output control unit 361 outputs the generated sound to the sound output unit 353. The output control unit 361 generates warning information in accordance with the vessel information RD received from the vessel management device 10 by the transportation management device 30. The output control unit 361 outputs the generated warning information to the output unit 35. When the output control unit 361 generates an image as the warning information, the output control unit 361 displays the generated image on the display unit 351. When the output control unit 361 generates a sound as the warning information, the output control unit 361 outputs the generated sound to the sound output unit 353.

The communication control unit 363 controls a communication with each of one or more vessel management devices 10 through the communication unit 34. For example, the communication control unit 363 transmits a detection start request to each of one or more vessel management devices 10 through the communication unit 34. The communication control unit 363 receives the vessel information RD from each of the one or more vessel management devices 10 through the communication unit 34, for example.

<Processing in which Vessel Management Device Detects Vessel Information>

Figure 5:
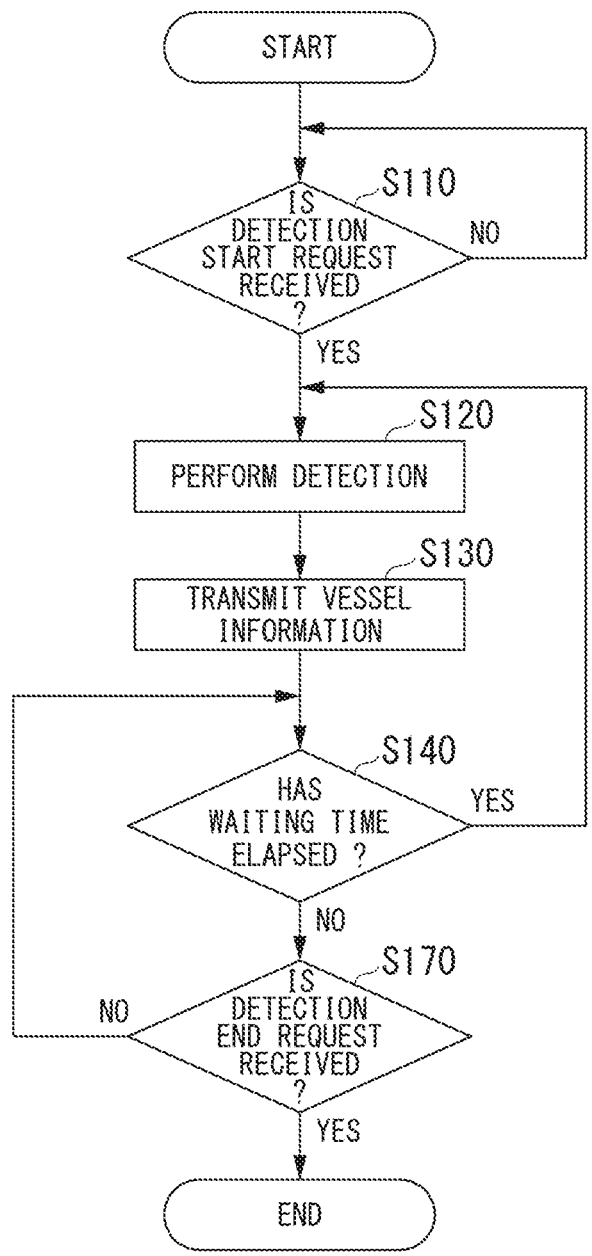
FIG. 5 is a diagram showing an example of a flow of processing in which a vessel management device 10-1 detects vessel information RD1.

Processing in which the vessel management device 10 detects the vessel information RD will be described below with reference to FIG. 5. The processing is performed by each of one or more vessel management devices 10 in the same manner. Therefore, the processing will be described below by using the vessel management device 10-1 as an example. FIG. 5 is a diagram showing an example of a flow of processing in which the vessel management device 10-1 detects vessel information RD1.

The detection control unit 161 waits until the vessel management device 10-1 receives the above-described detection start request from the transportation management device 30 (Step S110). Here, for example, when the vessel management device 10-1 communicates with each of a plurality of transportation management devices 30 (that is, when the vessel management device 10-1 establishes a communication with each of the plurality of transportation management devices 30), the detection control unit 161 waits until receiving a detection start request from any one of the plurality of transportation management devices 30.

Here, when the detection control unit 161 receives the detection start request in duplicate, the detection control unit 161 ignores the detection start request except for the detection start request which has been firstly received. The detection control unit 161 may ignore the detection start request except for the detection start request which has been received from one or more transportation management devices 30 predetermined among the plurality of transportation management devices 30. When the detection control unit 161 determines that the vessel management device 10-1 receives the detection start request from the transportation management device 30 (Step S110—YES), the detection control unit 161 controls the vessel information detection unit 13 to detect vessel information RD1 (Step S120). Specifically, in Step S120, the detection control unit 161 controls the pressure detection unit 131 to detect pressure in the vessel RV1 to which the vessel management device 10-1 is attached, controls the liquid level detection unit 133 to detect the height of a liquid level of the LNG in the vessel RV1, and controls the position detection unit 137 to detect the current position of the vessel RV1. As described above, the detection control unit 161 detects pressure information indicating the pressure detected by the pressure detection unit 131, liquid level information indicating the height of the liquid level, which is detected by the liquid level detection unit 133, and position information indicating the current position detected by the position detection unit 137, as the vessel information RD1. In the example, the position information includes latitude and longitude indicating the current position of the vessel management device 10-1 and information indicating the direction to which the vessel management device 10-1 is directed.

Then, the communication control unit 163 transmits the vessel information RD1 controlled to be detected by the vessel information detection unit 13 by the detection control unit 161 in Step S120, to the transportation management device 30 (Step S130). Here, when the vessel management device 10-1 communicates with the plurality of transportation management devices 30 (that is, when the vessel management device 10-1 establishes communications with the plurality of transportation management devices 30), the communication control unit 363 transmits the vessel information RD1 to each of the plurality of transportation management devices 30. At this time, the communication control unit 163 transmits the vessel information RD1 which has been associated with identification information for identifying the vessel management device 10-1 (that is, identification information for identifying the vessel RV1 to which the vessel management device 10-1 is attached), to each of the plurality of transportation management devices 30. The identification information for identifying the vessel RV1 may be any information so long as the information can be used for identifying the vessel RV1. The identification information may be an Internet protocol (IP) address, a media access control (MAC) address, or the like assigned to the vessel management device 10-1, or may be a tag assigned to the position detection unit 137 being a GPS receiver provided in the vessel management device 10-1.

Then, the detection control unit 161 determines whether or not the above-described waiting time has elapsed from a time point at which the process of Step S120 has been performed (Step S140). For example, the waiting time is one second. The waiting time may be a time shorter than one second or may be a time longer than one second. When the detection control unit 161 determines that the waiting time has elapsed (Step S140—YES), the detection control unit 161 transitions to Step S120 and controls the vessel information detection unit 13 to detect the vessel information RD1 again. When the detection control unit 161 determines that the waiting time has not elapsed (Step S140—NO), the detection control unit 161 determines whether or not the vessel management device 10-1 receives a detection end request from any one of the plurality of transportation management devices 30 (Step S170). The detection end request is a request for causing the vessel information detection unit 13 to end detection of the vessel information RD1. Here, when the detection control unit 161 receives the detection end request in duplicate, the detection control unit 161 ignores the detection end request except for the detection end request which has been firstly received. The detection control unit 161 may ignore the detection end request except for the detection end request which has been received from one or more transportation management devices 30 predetermined among the plurality of transportation management devices 30. When the detection control unit 161 determines that the vessel management device 10-1 does not receive the detection end request from any of the plurality of transportation management devices 30 (Step S170—NO), the detection control unit 161 transitions to Step S140 and determines whether or not the above-described waiting time has elapsed from a time point at which the process of Step S120 has been performed, again. When the detection control unit 161 determines that the vessel management device 10-1 receives the detection end request from any one of the plurality of transportation management devices 30 (Step S170—YES), the detection control unit 161 ends the processing.

<Processing of Managing LNG in Manner that Transportation Management Device Outputs Warning Information>

Figure 6:
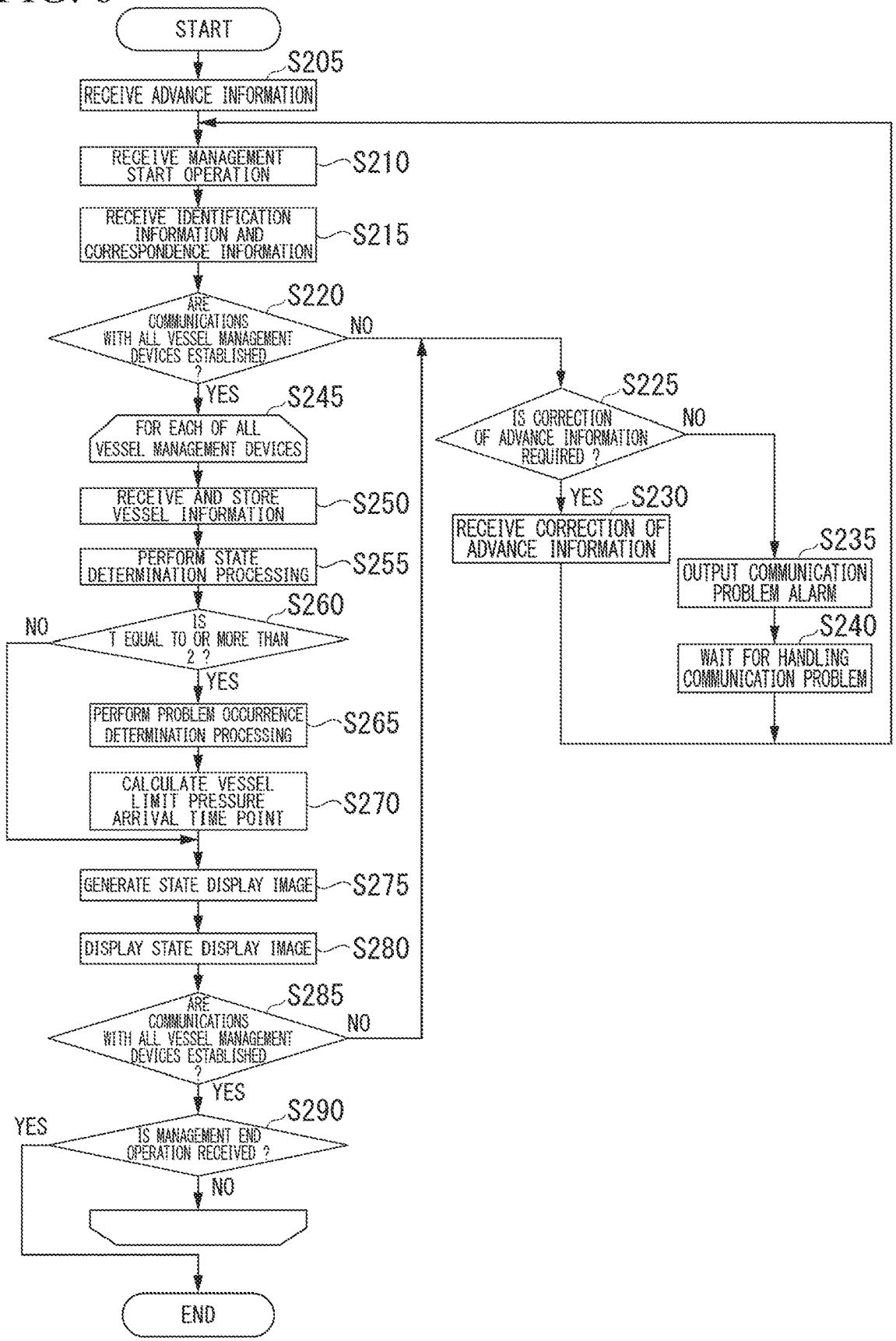
FIG. 6 is a diagram showing an example of a flow of processing of managing an LNG in a manner that a transportation management device 30-1 outputs warning information.

Processing of managing railway transportation of an LNG in a manner that the transportation management device 30 outputs warning information will be described below with reference to FIG. 6. The processing is performed by each of one or more transportation management devices 30 in the same manner.

The output control unit 361 waits until a user inputs advance information to the transportation management device 30 before management of railway transportation of the LNG is started (Step S205). The advance information includes some or all of route map information, estimated arrival time point information, estimated transportation end time-point information, and identification information. The route map information indicates a route map including at least one information of a station through which the tank container passes in the middle of railway transportation of the LNG and a station at which the tank container stops in the middle of railway transportation of the LNG. The estimated arrival time point information includes at least one of information indicating an estimated time point at which the tank container passes through a station (through which the tank container is planned to pass in the middle of railway transportation of the LNG) and information indicating an estimated time point at which the tank container arrives at a station (at which the tank container stops in the middle of railway transportation of the LNG). The estimated transportation end time-point information may be information indicating an estimated time point at which loading and unloading of the LNG are ended in each of all the vessels RV. The identification information is identification information of each of all vessel management devices 10 (simply referred to as all vessel management devices 10 below) to be used in railway transportation of the LNG. The advance information may include another type of information. The transportation management device 30 may have a configuration of automatically acquiring a portion or the entirety of the advance information from another device, instead of a configuration in which the advance information is input by the user. For example, when an operation to end an input of the advance information is received from the user, the output control unit 361 determines that the user has input the advance information to the transportation management device 30, and transitions to Step S210.

Then, the communication control unit 363 waits until a management start operation is performed on the transportation management device 30 by the user at a timing when transportation management being management of railway transportation of the LNG is intended to be started (for example, timing before the railway vehicle TR departs from a departure point) (Step S210). The management start operation refers to an operation of causing the transportation management device 30 to start performing the processes of Step S215 to Step S290. When the management start operation is performed on the transportation management device 30 by the user, the communication control unit 363 establishes a communication with each of all the vessel management devices 10 and transitions to Step S215.

Then, the output control unit 361 waits until the user inputs identification information and correspondence information to the transportation management device 30. The identification information is assigned to each of all the vessel management devices 10 and is different from each other. The correspondence information refers to information in which the identification information of the vessel management device 10 is associated with car number information indicating a car number in the railway vehicle TR and a car number of the container freight car DC in which the tank container TC including the vessel RV to which the vessel management device 10 is attached, for each of all the vessel management devices 10. For example, when an operation to end an input of the identification information and the correspondence information is received from the user, the output control unit 361 determines that the user has input the identification information and the correspondence information to the transportation management device 30, and transitions to Step S220. The identification information and the correspondence information may be stored in the storage unit 32 by the user in advance.

Then, the transportation management device 30 determines whether or not communications with all the vessel management devices 10 are established (Step S220). Specifically, when the identification information in the advance information input from the user in Step S205 includes all pieces of identification information received from the vessel management devices 10 with which communications are established, and when the number of pieces of the identification information in the advance information input from the user in Step S205 is equal to the number of pieces of the identification information received from the vessel management devices 10 with which communications are established, the transportation management device 30 determines that the communications with all the vessel management devices 10 are established. When the identification information in the advance information input from the user in Step S205 does not include at least some of pieces of the identification information received from the vessel management devices 10 with which communications are established, the transportation management device 30 determines that the communications with all the vessel management devices 10 are not established. When the identification information in the advance information input from the user in Step S205 includes all pieces of identification information received from the vessel management devices 10 with which communications are established, and when the number of pieces of the identification information in the advance information input from the user in Step S205 is not equal to the number of pieces of the identification information received from the vessel management devices 10 with which communications are established, the transportation management device 30 determines that the communications with all the vessel management devices 10 are not established.

When it is determined that the communications with all the vessel management devices 10 are not established (Step S220—NO), the output control unit 361 determines whether or not correction of the advance information input by the user is required (Step S230). Specifically, when the identification information in the advance information input from the user in Step S205 does not include at least some of pieces of the identification information received from the vessel management devices 10 with which communications are established, the output control unit 361 determines that correction of the advance information input by the user is required. When the identification information in the advance information input from the user in Step S205 includes all pieces of identification information received from the vessel management devices 10 with which communications are established, and when the number of pieces of the identification information in the advance information input from the user in Step S205 is more than the number of pieces of the identification information received from the vessel management devices 10 with which communications are established, there is a possibility of a communication problem occurring, and thus the output control unit 361 determines that correction of the advance information input by the user is not required.

When the output control unit 361 determines that correction of the advance information input by the user is required (Step S225—YES), the output control unit 361 waits until the user re-inputs the advance information to the transportation management device 30 (Step S230). When an operation to end the re-input of the advance information is received from the user, the output control unit 361 determines that the user has re-input the advance information to the transportation management device 30, and transitions to Step S210.

When the output control unit 361 determines that correction of the advance information input by the user is not required (Step S225—NO), there is a possibility of a communication problem occurring, and thus the output control unit 361 outputs a communication problem alarm to the output unit 35 (Step S235). The communication problem alarm is an alarm for a notification that a communication problem occurs. The output control unit 361 waits until the communication problem is solved (Step S240). For example, when an operation indicating that the communication problem is solved is received, the output control unit 361 determines that the communication problem is solved. When the output control unit 361 determines that the communication problem is solved, the output control unit 361 transitions to Step S210.

When the output control unit 361 determines that the communications with all the vessel management devices 10 are established (Step S220—YES), the output control unit 361 considers all the vessel management device 10 as one lump, and repeats the processes of Step S250 to Step S290 for each lump in a period until the output control unit 361 ends the management of railway transportation of the LNG in accordance with the determination result in Step S290 described later (Step S245). The following descriptions will be made on the assumption that a time point at which the process of Step S245 is started first time is referred to as a transportation management start time point TS.

The communication control unit 363 acquires the vessel information RD from each of all the vessel management devices 10 in a period from the transportation management start time point TS until a predetermined time interval has elapsed from a time point $T_t$. The time point T indicates each predetermined timing (for example, the timing is every five minutes. The timing may be a timing which is longer than or shorter than five minutes). For example, the time interval is five minutes. The time interval may be a time which is longer than or shorter than five minutes. The communication control unit 363 controls the storage unit 32 to store the vessel information RD and time point information in association with each other, for each acquired vessel information RD (Step S250). The time point information indicates a time point at which the vessel information RD is acquired. Here, t represents a transportation management number which is the number of times of the transportation management device 30 acquiring the vessel information RD from each of all the vessel management devices 10, that is, the number of times of performing the process of Step S250. t is an integer increasing as 1, 2, . . . , and k. k may be any integer so long as the integer is positive.

Then, the output control unit 361 determines a pressure state based on the vessel information RD, for each vessel information RD stored by the storage unit 32 in Step S250 (Step S255). The pressure state is a state regarding pressure among states of the vessel RV. As an example, a case where the pressure state is divided into three states of a normal state, a first dangerous state, and a second dangerous state will be described below. A configuration in which the pressure state is not divided into a plurality of stages may be made. The pressure state may be divided into two stages or four or more stages. Instead of some or all of the normal state, the first dangerous state, the second dangerous state, the three states may include other states. The normal state, the first dangerous state, and the second dangerous state, and a detailed flow of the process of Step S255 will be described later.

Then, the output control unit 361 determines whether or not the transportation management number t is equal to or more than 2 (Step S260).

When the transportation management number t is equal to or more than 2 (Step S260—YES), the output control unit 361 performs problem occurrence determination processing (Step S265). Details of the flow of problem occurrence determination processing will be described later. The output control unit 361 calculates a vessel limit pressure arrival time point for each vessel RV (Step S270). The vessel limit pressure arrival time point is a time point at which the pressure of the vessel RV reaches a vessel limit pressure being limit pressure which can be allowed by the vessel RV. The detailed flow of calculation processing in Step S270 will be described later. After the process of Step S270 is performed, the output control unit 361 transitions to Step S275. When the output control unit 361 determines that the transportation management number t is less than 2 (Step S260—NO), the output control unit 361 transitions to Step S275. In Step S275, the output control unit 361 generates a state display image (Step S275). The state display image includes a state image which is information (image) indicating a state of each vessel RV. The output control unit 361 display the state display image generated in Step S275, on the display unit 351 (Step S280). Here, the state display image and each of the processes of Step S275 to Step S280 will be described with reference to FIG. 7.

Figure 7:
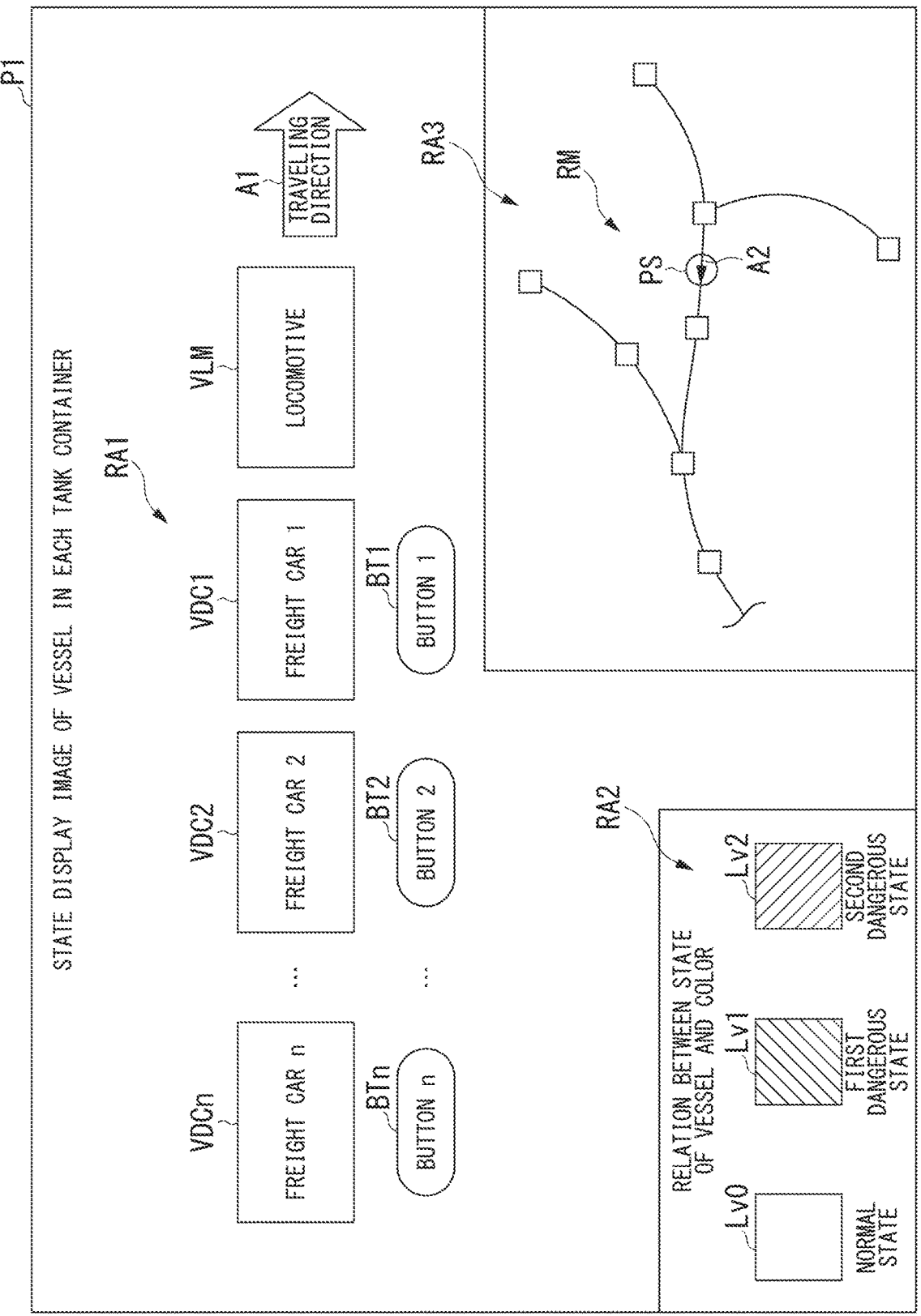
FIG. 7 is a diagram showing an example of a state display image.

FIG. 7 is a diagram showing an example of the state display image. An image P1 shown in FIG. 7 is an example of the state display image. In the example shown in FIG. 7, the image P1 includes a region RA1, a region RA2, and a region RA3. The image P1 may include either or neither the region RA2 nor the region RA3. The image P1 may include another type of information instead of either or both the region RA2 and the region RA3. The image P1 may include another type of information in addition to the region RA1, the region RA2, and the region RA3.

The region RA1 includes the above-described state image. For example, the state image includes an arrow A1, a locomotive image VLM, a container freight car image VDC, and n buttons BT. The arrow A1 indicates a traveling direction of the locomotive LM. The locomotive image VLM shows the locomotive LM traveling in a direction indicated by the arrow A1. The container freight car image VDC shows each of the n container freight cars DC pulled by the locomotive LM. The buttons BT correspond to the container freight car images VDC, respectively. Here, FIG. 7 shows the container freight car image VDC indicating the container freight car DCm which is the m-th container freight car DC, as a container freight car image VDCm. As described above, m is an integer which is any of 1 to n. FIG. 7 shows the button BT associated with the container freight car image VDCm, as a button BTm.

The output control unit 361 reads the identification information and the correspondence information stored in the storage unit 32 in advance, from the storage unit 32. The output control unit 361 generates each of n container freight car images VDC based on the identification information and the correspondence information which have been read. In the example shown in FIG. 7, the n container freight car images VDC are represented as rectangular images having the same shape. Some or all of the n container freight car images VDC may be images having a shape other than a rectangle or may be images having different shapes.

The output control unit 361 changes the display state of each of the n container freight car images VDC generated in the process of Step S275 performed at a certain timing, to a display state in accordance with the state of the vessel RV in the tank container TC placed in each container freight car DC, in the process of Step S275 performed at a timing after the above timing.

Here, an image showing a correspondence relation between the state of the vessel RV and the display state of the container freight car image VDC is displayed in the region RA2. For example, the display state may refer to a color of the container freight car image VDC. The display state may be other states relating to the display of the shape, a blinking pattern, and the like instead of the color.

In the example shown in FIG. 7, the image showing a correspondence relation between the state of the vessel RV and the display state of the container freight car image VDC is shown by three quadrangles having different colors. In this example, the difference in color between the three quadrangles is represented by the difference in hatching in a region inside the quadrangle. That is, in this example, a quadrangle Lv0 shows a display state of the container freight car image VDC corresponding to the normal state. In this example, a quadrangle Lv1 shows a display state of the container freight car image VDC in accordance with the first dangerous state. In this example, a quadrangle Lv2 shows a display state of the container freight car image VDC in accordance with the second dangerous state.

After the output control unit 361 generates the n container freight car images VDC, the output control unit 361 disposes the generated container freight car image VDC in the region RA1. At this time, the output control unit 361 arranges the n generated container freight car images VDC in the region RA1 such that the container freight car DC1 to the container freight car DCn from the locomotive LM in the railway vehicle TR are reproduced based on the identification information and the correspondence information which have been read from the storage unit 32, in this order. Thus, for example, when the three container freight cars DC are arranged in order of a container freight car DC1, a container freight car DC2, and a container freight car DC3 from the locomotive LM being the leading, the output control unit 361 can arrange the locomotive image VLM, a container freight car image VDC1, a container freight car image VDC2, and a container freight car image VDC3 in the region RA1 in order of the locomotive image VLM, the container freight car image VDC1, the container freight car image VDC2, and the container freight car image VDC3 in an opposite direction of the direction indicated by the arrow A1. That is, each of the container freight car images VDC corresponds to an example of container-freight car position information indicating the position of each container freight car DC in the railway vehicle TR.

When a container freight car image VDCm indicating the container freight car DCm which is a container freight car DC having a car number of m is disposed in the region RA1, the output control unit 361 disposes a button BTm associated with the container freight car image VDCm, along with the container freight car image VDCm. In the example shown in FIG. 7, the button BTm is disposed under the container freight car image VDCm in the region RA1. The button BTm may be disposed at another position corresponding to the container freight car image VDCm in the region RA1.

Figure 8:
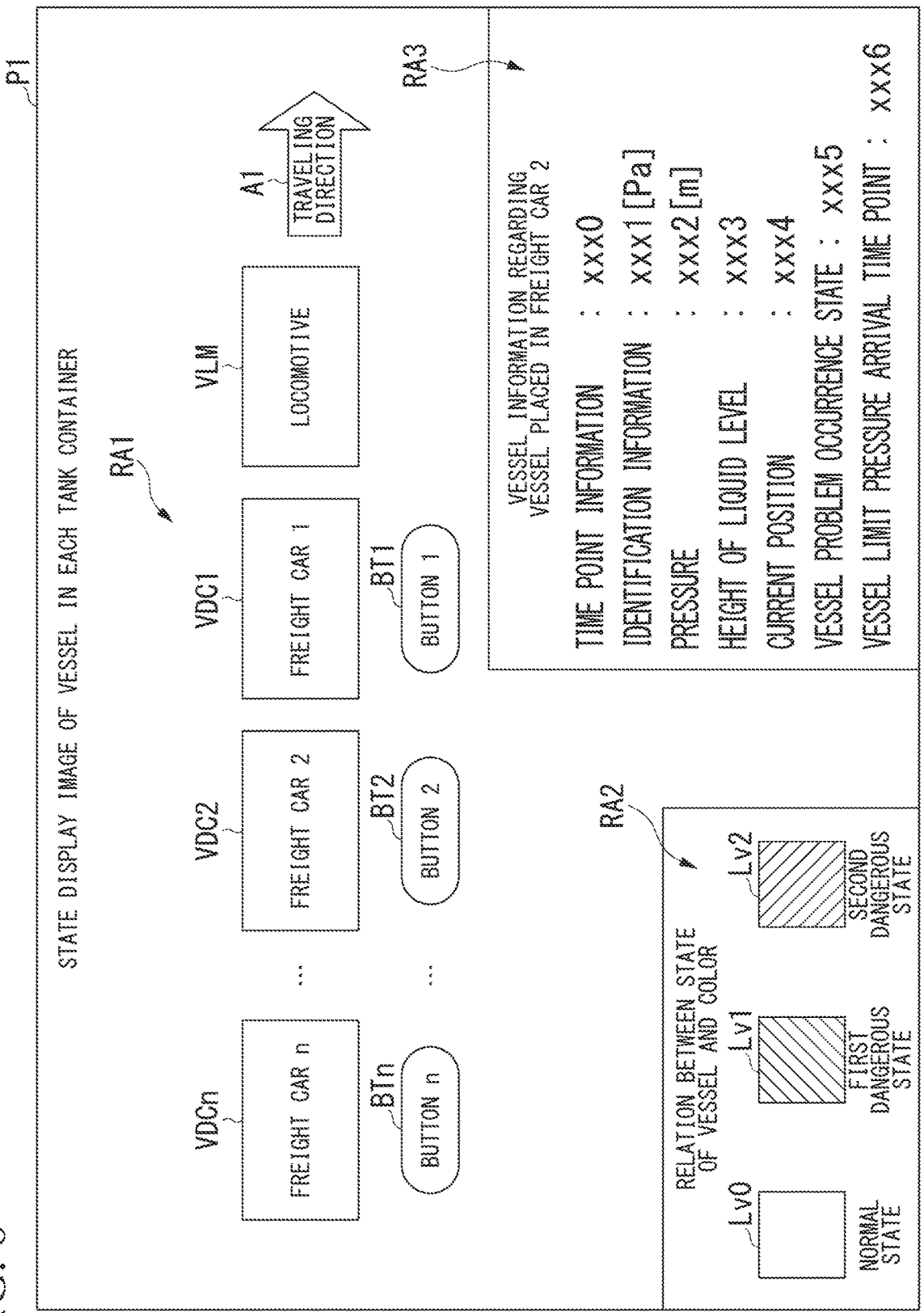
FIG. 8 is a diagram showing an example of an image P1 when a button BT2 is clicked.

The button BTm is a button for displaying vessel information RDm regarding a vessel RVm in the region RA3. When the user clicks the button BTm, the output control unit 361 acquires the vessel information RDm from the vessel management device 10-m attached to the vessel RVm. The output control unit 361 displays information including at least the pressure indicated by the pressure information included in the vessel information RDm in the region RA3 based on the acquired vessel information RDm, a determination result in the process of Step S265, and a calculation result in the process of Step S270, among the pressure, the height of the liquid level of the LNG in the vessel RVm, which is indicated by the liquid level information included in the vessel information RDm, the current position of the vessel RVm, which is indicated by the position information included in the vessel information RDm, time point information indicating a time point at which the vessel information RDm is acquired, whether or not a problem occurs in the vessel RVm (referred to as a vessel problem occurrence state of the vessel RVm below), and the vessel limit pressure arrival time point of the vessel RVm. FIG. 8 is a diagram showing an example of the image P1 when a button BT2 is clicked. In the example shown in FIG. 8, in this case, the output control unit 361 displays the time point information, the identification information of the vessel management device 10-m, and information including the pressure, the height of the liquid level, the current position, the vessel problem occurrence state, and the vessel limit pressure arrival time point, in the region RA3. For example, when the button BTm is clicked in a state where the vessel information RDm is displayed in the region RA3, the output control unit 361 deletes the vessel information RDm being displayed in the region RA3 and displays the image which has been displayed in the region RA3 before the vessel information RDm is displayed, in the region RA3.

Returning to FIG. 7, descriptions continues. The region RA3 is a region in which a route map is displayed when the vessel information RDm is not displayed. The route map is a diagram showing a route on which the railway vehicle TR travels. The image RM shown in FIG. 7 is an example of the route map displayed in the region RA3. A quadrangle in the image RM indicates a station at which the locomotive LM and each container freight car DC pulled by the locomotive LM may stop. In the image RM, an image indicating the current position of the locomotive LM is displayed at a position in the route map, which corresponds to the current position of the locomotive LM. An image PS shown in FIG. 7 is an example of the above image. An arrow A2 displayed in a region of the image PS indicates a traveling direction of the locomotive LM.

For example, the output control unit 361 reads route map information which indicates the route map, is stored in the storage unit 32 in advance, and includes information indicating a list of devices stored in each station, from the storage unit 32. The output control unit 361 acquires the position information indicating the current position of the vessel management device 10, from the vessel management device 10 attached to the vessel RV disposed in the container freight car DC to be closest to the locomotive LM. The output control unit 361 specifies the current position indicated by the acquired position information. The output control unit 361 generates the route map and the image PS, which are to be displayed in the region RA3, based on the read route map information and the specified current position. The output control unit 361 arranges the generated route map in the region RA3. The output control unit 361 arranges the generated image PS to be superimposed on the route map disposed in the region RA3. In the output control unit 361, calibration of the correspondence relation between the position in the route map and the current position indicated by the position information is performed in advance. The output control unit 361 updates the route map displayed in the region RA3 every time a predetermined update time has elapsed, in a period in which the route map is displayed in the region RA3.

Returning to FIG. 6, descriptions continues. After the process of Step S280 is performed, the output control unit 361 determines whether or not the communications with all the vessel management devices 10 are established (Step S285).

When the output control unit 361 determines that the communications with all the vessel management devices 10 are not established (Step S285—NO), the output control unit 361 transitions to Step S225. When the output control unit 361 determines that the communications with all the vessel management devices 10 are not established (Step S285—YES), the output control unit 361 determines whether or not the transportation management device 30 receives a management end operation from the user (Step S290). The management end operation is an operation in which the transportation management device 30 ends the processing in the flowchart shown in FIG. 6. When the output control unit 361 determines that the transportation management device 30 receives the management end operation from the user (Step S290—YES), the output control unit 361 ends the processing. When the output control unit 361 determines that the transportation management device 30 receives the management end operation from the user (Step S290—NO), the output control unit 361 transitions to Step S245 and starts the processes of Step S250 to Step S290, which are the next repetitive processes.

Then, the process of Step S280 will be more specifically described by using the vessel information RD2 as an example. In Step S280, the output control unit 361 updates the display state of the container freight car image VDC2 showing the container freight car DC2 in which the tank container TC2 including the vessel RV2 to which the vessel management device 10-2 as a transmission source of the vessel information RD2 is attached is disposed, based on the vessel information RD2.

The output control unit 361 generates the container freight car image VDC2 based on the vessel information RD2. More specifically, the output control unit 361 generates the container freight car image VDC2 based on the vessel information RD2 and a condition which is the state divided into the above-described three stages and corresponds to each state of the vessel RV2. In Step S280, the output control unit 361 may generate the container freight car image VDC2 based on the vessel information RD2 and a certain state (that is one state) in the vessel RV2.

The normal state is a state of the vessel RVm when the vessel information RDm satisfies a normal condition being a predetermined condition. The normal condition is a condition corresponding to the normal state. Specifically, in the normal condition, pressure indicated by the pressure information included in the vessel information regarding the vessel RVm is smaller than a first pressure threshold TP1. Here, the first pressure threshold TP1 is, for example, 0.36 MPa. The first pressure threshold TP1 may be pressure lower than 0.36 MPa or may be pressure higher than 0.36 MPa.

The first dangerous state is a state of the vessel RVm when the vessel information RDm satisfies a first dangerous condition being a predetermined condition. The first dangerous condition is a condition corresponding to the first dangerous state. Specifically, in the first dangerous condition, pressure indicated by the pressure information included in the vessel information RDm is equal to or greater than the first pressure threshold TP1 and is smaller than a second pressure threshold TP2. Here, the second pressure threshold TP2 is pressure higher than the first pressure threshold TP1 and may have any value so long as the pressure is lower than the maximum pressure allowable by the vessel RVm. For example, the second pressure threshold TP2 is 0.48 MPa. As an example, a case where the second pressure threshold TP2 is a pressure at which a safety valve of the vessel RVm starts to open among types of pressure in the vessel RVm will be described below. The second pressure threshold TP2 may be pressure lower than 0.48 MPa or may be pressure higher than 0.48 MPa.

The second dangerous state is a state of the vessel RVm when the vessel information RDm satisfies a second dangerous condition being a predetermined condition. The second dangerous condition is a condition corresponding to the second dangerous state. Specifically, in the second dangerous condition, pressure indicated by the pressure information included in the vessel information RDm is smaller than the second pressure threshold TP2.

The degree of risk increases in order of the normal state, the first dangerous state, and the second dangerous state. The condition corresponding to the normal state, the condition corresponding to the first dangerous state, and the condition corresponding to the second dangerous state are an example of an output condition.

Figure 9:
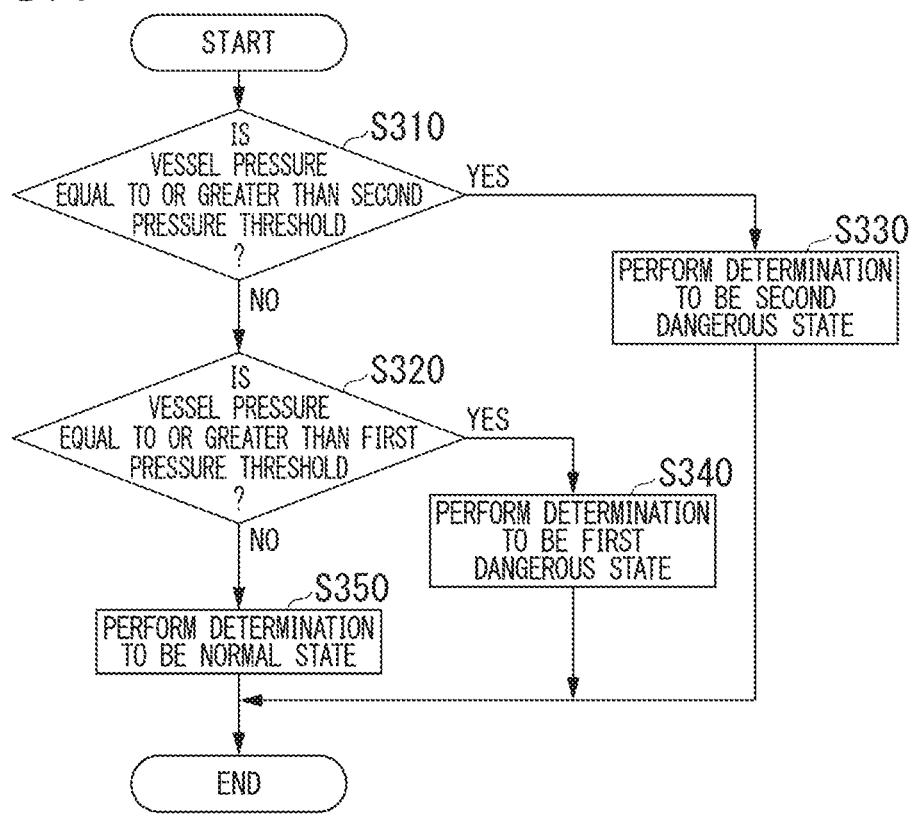
FIG. 9 is a diagram showing an example of a flow of determination processing in Step S255.

Then, the process of Step S255 will be more specifically described with reference to FIG. 9 by using the vessel information RD2 as an example. In Step S255, as described above, the output control unit 361 determines whether the current state of the vessel RV2 corresponds to any of the normal state, the first dangerous state, and the second dangerous state, based on the vessel information RD2, the normal condition, the first dangerous condition, and the second dangerous condition. FIG. 9 is a diagram showing an example of a flow of determination processing in Step S255.

The output control unit 361 determines whether or not the pressure of the vessel RV2 is equal to or greater than the second pressure threshold TP2 (Step S310). When the output control unit 361 determines that the pressure is equal to or greater than the second pressure threshold TP2 (Step S310—YES), the output control unit 361 determines that the pressure state of the vessel RV2 is the second dangerous state (Step S330) and then ends the processing.

When the output control unit 361 determines that the pressure of the vessel RV2 is smaller than the second pressure threshold TP2 (Step S310—NO), the output control unit 361 determines whether or not the pressure is equal to or greater than the first pressure threshold TP1 (Step S320). When the output control unit 361 determines that the pressure is equal to or greater than the first pressure threshold TP1 (Step S320—YES), the output control unit 361 determines that the pressure state of the vessel RV2 is the first dangerous state (Step S340) and then ends the processing. When the output control unit 361 determines that the pressure is smaller than the first pressure threshold TP1 (Step S320—NO), the output control unit 361 determines that the pressure state of the vessel RV2 is the normal state (Step S350) and then ends the processing.

Then, the process of Step S275 will be more specifically described by using the vessel information RD2 as an example. In Step S275, the output control unit 361 generates the container freight car image VDC2 having a display state depending on the current state of the vessel RV2, in accordance with a determination result in Step S255. That is, when the output control unit 361 determines that the state of the vessel RV2 is the normal state, the output control unit 361 generates the container freight car image VDC2 having a display state corresponding to the normal state. When the output control unit 361 determines that the state of the vessel RV2 is the first dangerous state, the output control unit 361 generates the container freight car image VDC2 having a display state corresponding to the first dangerous state. The container freight car image VDC2 having the display state corresponding to the first dangerous state is an example of warning information. When the output control unit 361 determines that the state of the vessel RV2 is the second dangerous state, the output control unit 361 generates the container freight car image VDC2 having a display state corresponding to the second dangerous state. The container freight car image VDC2 having the display state corresponding to the second dangerous state is an example of the warning information.

Figure 10:
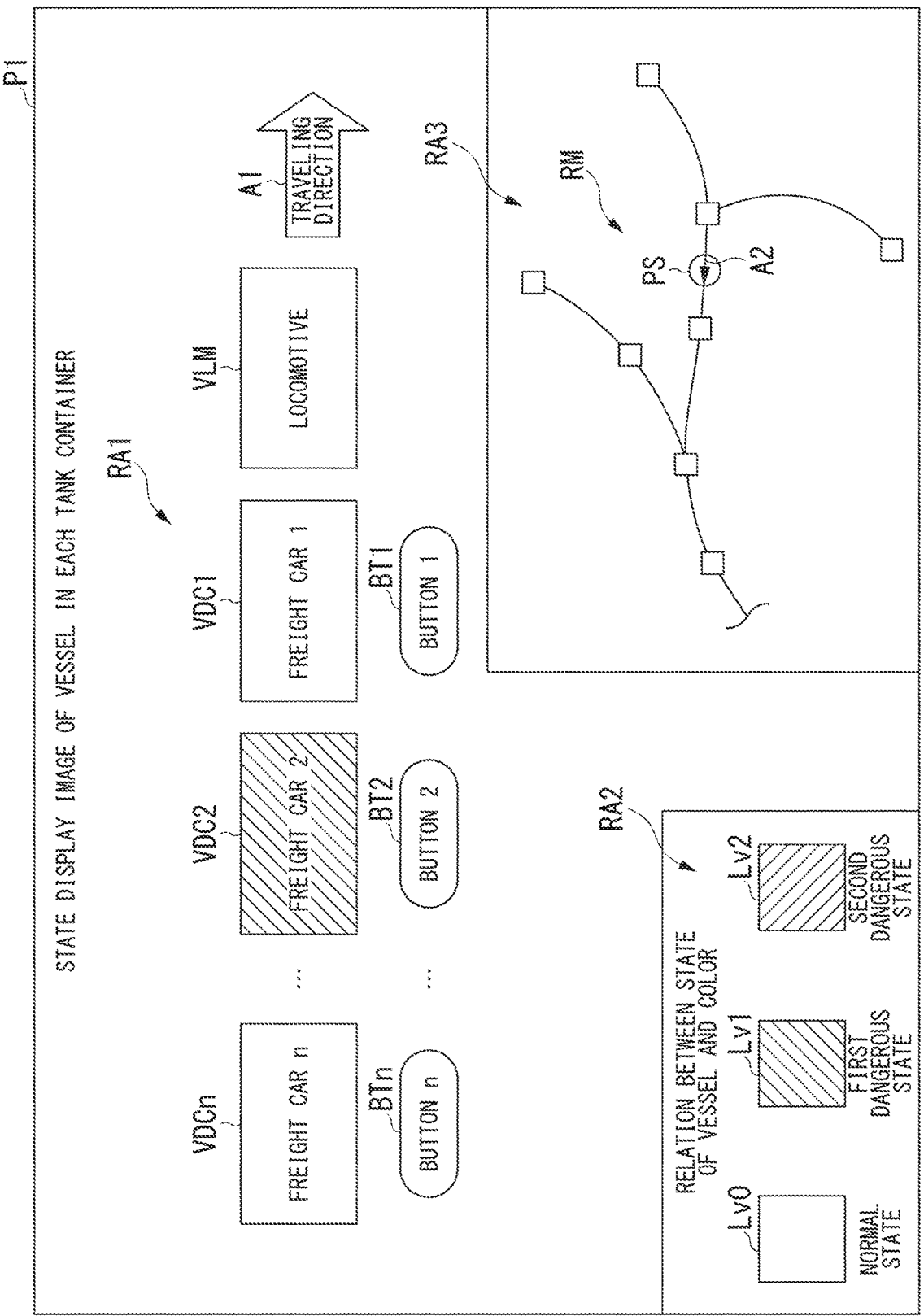
FIG. 10 is a diagram showing an example of a state display image P1 in which a container freight car image VDC2 in accordance with a first dangerous state is displayed.

The output control unit 361 re-arranges the new generated container freight car image VDC2 at a position at which the container freight car image VDC2 has been disposed until now in the region RA1. FIG. 10 is a diagram showing an example of the state display image P1 in which the container freight car image VDC2 in accordance with the first dangerous state is displayed. That is, the example shown in FIG. 10 is an example of the state display image P1 when the output control unit 361 determines that the pressure state of the vessel RV2 is the first dangerous state in Step S255. FIG.

Figure 11:
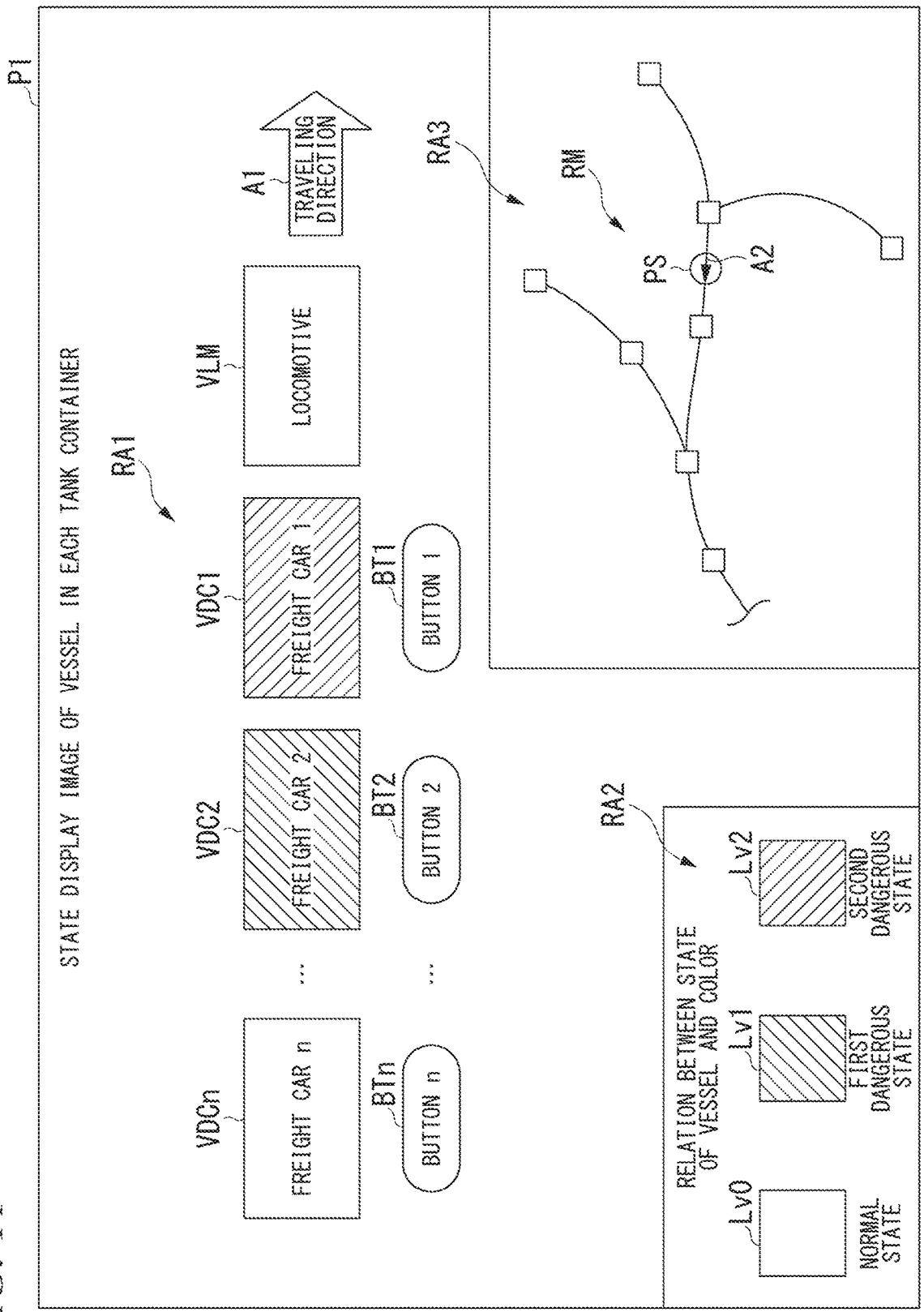
FIG. 11 is a diagram showing an example of the state display image P1 in which the container freight car image VDC2 in accordance with a second dangerous state is displayed.

11 is a diagram showing an example of the state display image P1 in which the container freight car image VDC2 in accordance with the second dangerous state is displayed. In FIG. 11, the container freight car image VDC1 in accordance with the first dangerous state is also displayed in the state display image P1. That is, the example shown in FIG. 11 is an example of the state display image P1 when the output control unit 361 determines that the pressure state of the vessel RV2 is the second dangerous state in Step S255 and determines the pressure state of the vessel RV1 is the first dangerous state in Step S255. As described above, in Step S280, the output control unit 361 performs displaying of the container freight car image VDC.

Here, the output control unit 361 may output warning sound in accordance with the first dangerous state and the second dangerous state, to the sound output unit 353. In this case, the output control unit 361 preferentially outputs warning sound in accordance with the second dangerous state having a degree of risk higher than the degree of risk in the first dangerous state, to the sound output unit 353.

In Step S280, for example, when the next vessel information RD is not received from the vessel management device 10 in a period from a timing at which the vessel information RD is received from a certain vessel management device 10 in the latest Step S250 until a determination time being a predetermined time has elapsed, the output control unit 361 may delete a container freight car image VDC showing a container freight car DC in which a tank container TC including a vessel RV to which the vessel management device 10 is attached is placed, from the region RA1. Alternatively, the output control unit 361 may change the display state of the container freight car image VDC to a display state representing that the container freight car DC is disconnected with the locomotive LM. For example, the determination time is ten minutes. The determination time may be a time shorter than ten minutes or may be a time longer than ten minutes.

Figure 12:
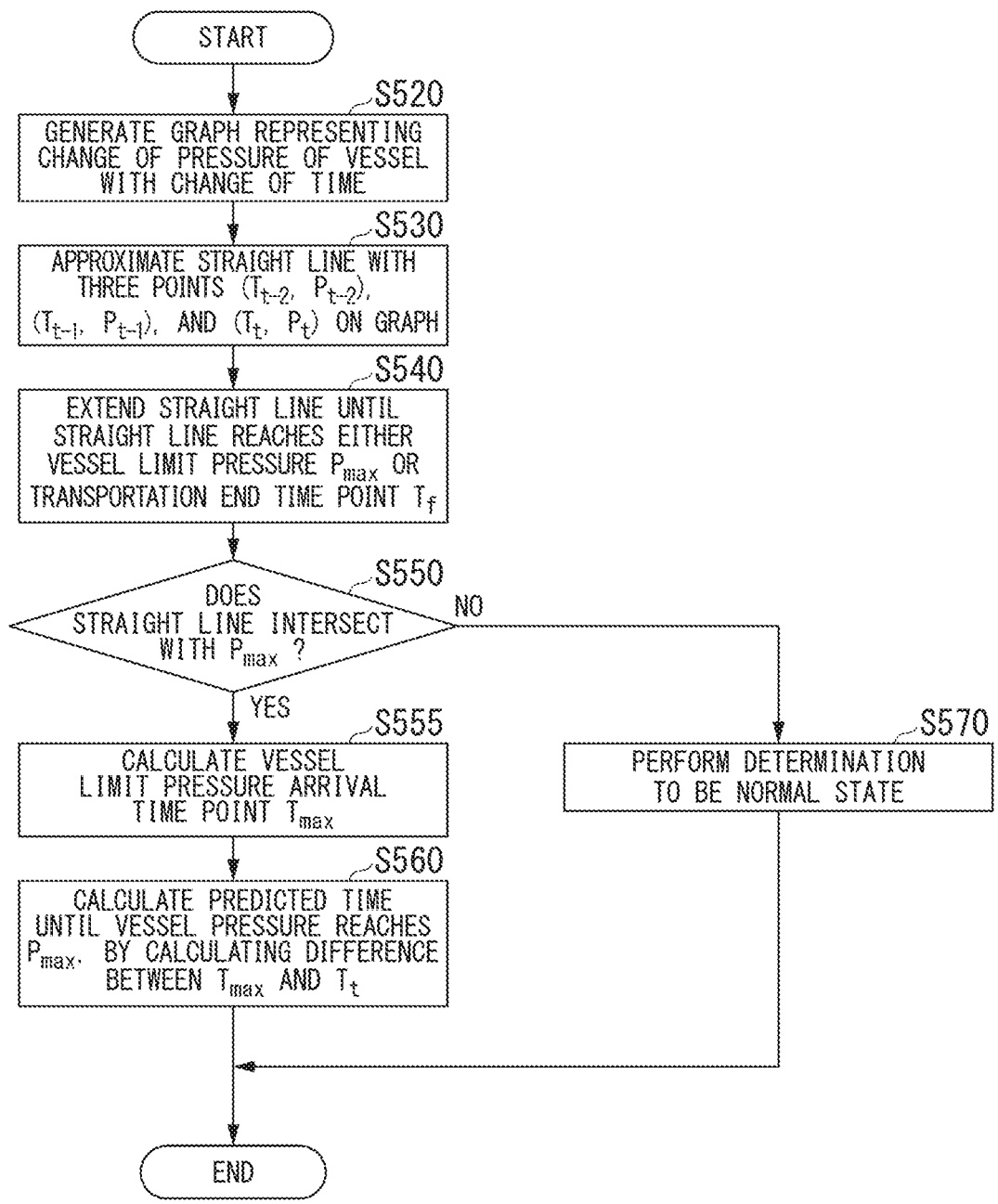
FIG. 12 is a diagram showing an example of a flow of calculation processing of a vessel limit pressure arrival time point by an output control unit 361 in Step S270.

Next, calculation processing of the vessel limit pressure arrival time point by the output control unit 361 in Step S270 will be described with reference to FIG. 12. FIG. 12 is a diagram showing an example of a flow of calculation processing of the vessel limit pressure arrival time point by the output control unit 361 in Step S270. As an example, a case where the vessel limit pressure is 0.6 MPa will be described below. The vessel limit pressure may be pressure lower than 0.6 MPa or may be pressure higher than 0.6 MPa. For easy descriptions, the vessel limit pressure is described as $P_{max}$.

Figure 13:
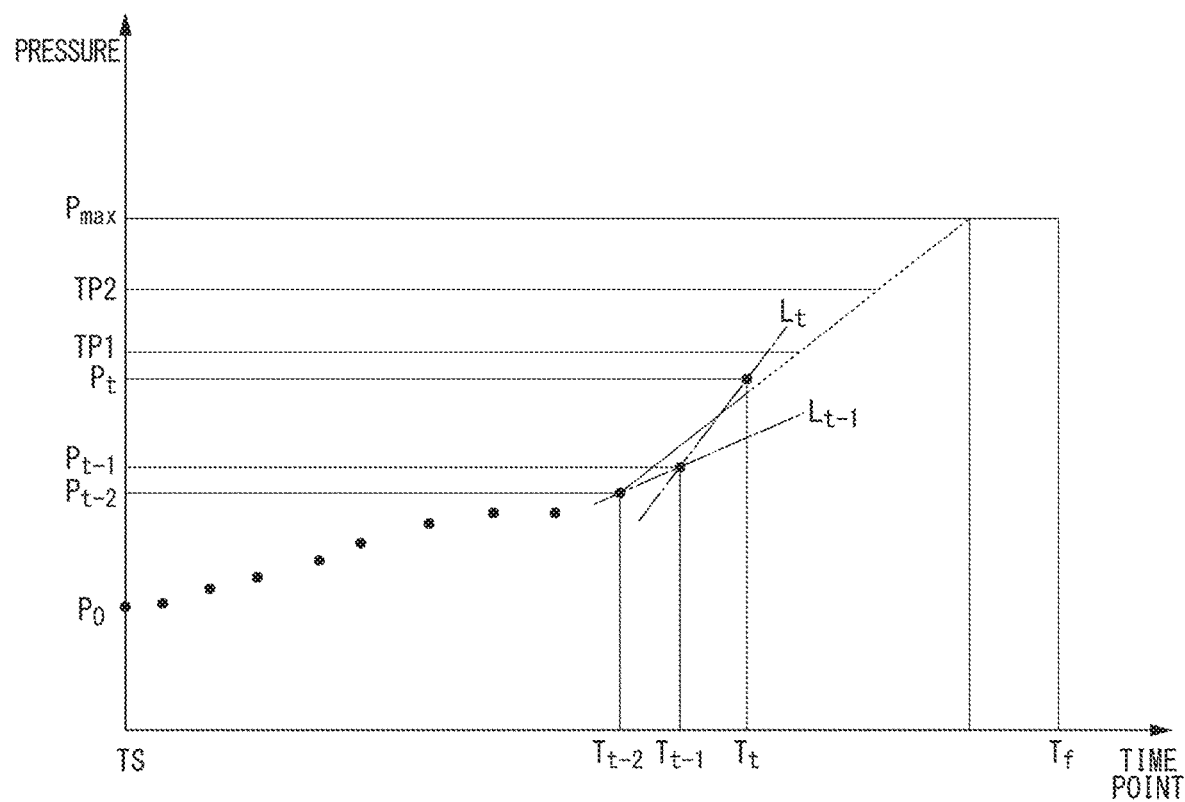
FIG. 13 is a diagram showing an example of a graph representing a pressure change rate from a transportation management start time point TS to each time point $T_r$.

The output control unit 361 generates a graph representing a pressure change rate from the transportation management start time point TS to each time point $T_t$ (Step S520). Here, FIG. 13 is a diagram showing an example of the graph representing the pressure change rate from the transportation management start time point TS to each time point $T_t$. Here, the graph represents the change of pressure of the vessel RV with a change of time. In the graph shown in FIG. 13, a horizontal axis indicates a time point. In the graph, a vertical axis indicates the pressure. The pressure of vessel RV at a time point $T_t$ is Pt. The graph is obtained by plotting the change of the pressure Pt from the transportation management start time point TS to the time point $T_t$. FIG. 13 is a display example of the graph. P0 shown in the graph indicates the pressure of the vessel RV at the transportation management start time point TS.

Then, the output control unit 361 calculates a straight line by any approximation method based on three time points ($T_{t-2}$, $T_{t-1}$, and Tt) which includes the time point $T_t$ and are immediately before the time point when viewed from the time point $T_t$ and pressure ($P_{t-2}$, $P_{t-1}$, and Pt) of the vessel RV at the three time points, for each time point $T_t$ (Step S530). The approximation method is, for example, the least square method, but may be another linear approximation method, or may be a curve approximation method instead of the linear approximation method. The output control unit 361 extends the straight line to a time point after the time point $T_t$ until any of conditions in which a value in a Y-axis on the straight line reaches $P_{max}$ and in which a value in an X-axis on the straight line reaches $T_f$ (Step S540). Here, $T_f$ indicates a time point at which railway transportation of the LNG is ended. Then, the output control unit 361 determines whether or not the value in the Y-axis on the extended straight line reaches $P_{max}$ before the value in the X-axis on the extended straight line reaches $T_f$ (Step S550). When it is determined that the value in the Y-axis on the extended straight line does not reach $P_{max}$ before the value in the X-axis on the extended straight line reaches $T_f$ (Step S550—NO), it is predicted that the pressure of the vessel RV does not reach $P_{max}$ during the railway transportation of the LNG. Thus, the output control unit 361 determines that the vessel RV is in the normal state (Step S570), and ends the processing. When it is determined that the value in the Y-axis on the extended straight line reaches $P_{max}$ before the value in the X-axis on the extended straight line reaches $T_f$ (Step S550—YES), the output control unit 361 calculates a predicted time point $T_{max}$ at which the pressure of the vessel RV reaches the vessel limit pressure (Step S555). The output control unit 361 calculates a difference between the predicted time point $T_{max}$ and the time point $T_t$, calculates a predicted time until the pressure of the vessel RV reaches $P_{max}$ (Step S560), and then ends the processing.

When it is predicted that the pressure of the vessel RV reaches $P_{max}$ during the railway transportation of the LNG, for example, the output control unit 361 can press on the button BTm for the freight car VDCm in FIG. 8 to display the predicted time point $T_{max}$ in the region RA2.

For example, the output control unit 361 may display the graph shown in FIG. 13 in any region (RA1 to RA3) in the state display image P1 by a method of pressing on the button BTm for the freight car VDCm in FIG. 7 twice or a method of pressing on a button (not shown) different from the button BTm.

The output control unit 361 may display some or all of graphs which correspond to the container freight car images VDC and are shown in FIG. 13, on one screen. In this case, the transportation management device 30 can cause the user to compare change characteristics of the pressure of the vessel RV with respect to the change of time, for each vessel RV. As a result, for example, it is possible to cause the user to perform a treatment for improving operational safety, for example, in which the LNG is discharged from a vessel RV in which the pressure of the vessel RV increases rapidly, at a railway station close to the current position.

The output control unit 361 may display a portion or the entirety of the graph corresponding to the container freight car image VDCm for railway transportation of the LNG, on one screen. In this case, the transportation management device 30 can cause the user to compare change characteristics of the pressure of the vessel RVm in time series, for each vessel RVm. As a result, for example, it is recognized that a change rate of the pressure of the vessel RVm increases to be equal to or more than a predetermined inclination when the vessel RVm is used the latest, by the graph, it is possible to cause the user to perform a treatment for improving maintainability such as performing maintenance such as evacuation.

Figure 14:
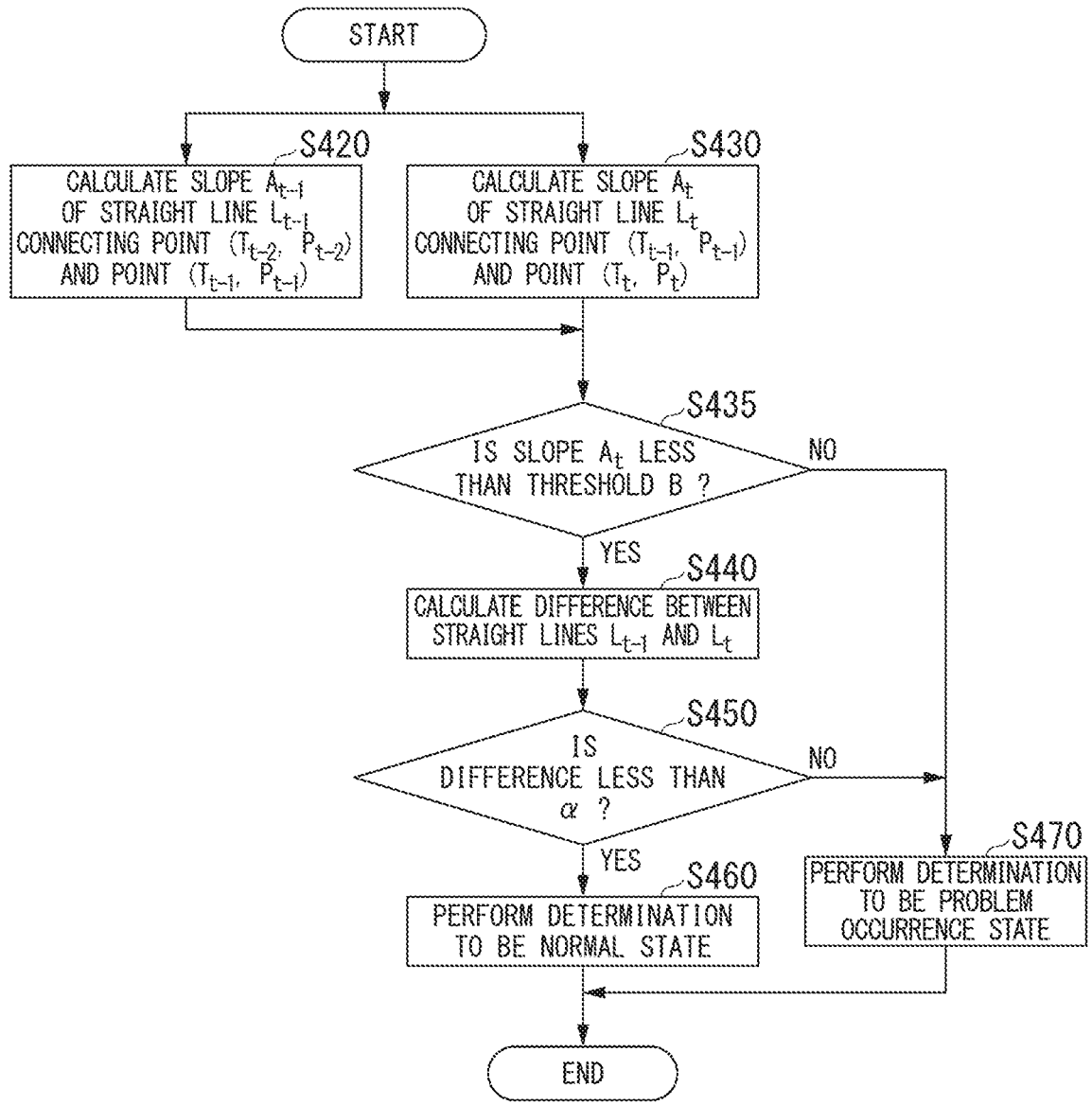
FIG. 14 is a diagram showing an example of a flow of problem occurrence determination processing in Step S265 in FIG. 6.

Next, a detailed flow of problem occurrence determination processing in Step S265 in FIG. 6 will be specifically described with reference to FIG. 14. FIG. 14 is a diagram showing an example of the flow of problem occurrence determination processing in Step S265 in FIG. 6.

The output control device 361 calculates a slope $A_{t-1}$ of a straight line $L_{t-1}$, a slope $A_t$ of a straight line $L_t$ at each time point $T_t$ based on the graph shown in FIG. 13 (Step S420, Step S430). The straight line $L_{t-1}$ connects a point $(T_{t-2}, P_{t-2})$ and a point $(T_{t-1}, P_{t-1})$. The straight line $L_t$ connects a point $(T_{t-1}, P_{t-1})$ and a point $(T_t, P_t)$. That is, the output control unit 361 performs the process of Step S420 and the process of Step S430 in parallel with each other. The output control unit 361 may sequentially perform the process of Step S420 and the process of Step S430.

After the processes of Step S420 and Step S430 are performed, the output control device 361 determines whether or not the slope $A_t$ of the straight line $L_t$ shown in FIG. 13 is smaller than a predetermined threshold B (Step S435). When the slope $A_t$ is equal to or greater than the threshold B, a possibility that abnormality such as an abnormal increase in pressure occurs in the vessel RV is high. For example, the threshold B is 0.1 (MPa/min). The threshold B may be greater than 0.1 (MPa/min) or smaller than 0.1 (MPa/min). When the output control unit 361 determines that the slope $A_t$ of the straight line $L_t$ is equal to or greater than the threshold B (Step S435—NO), the output control unit 361 determines that the state of the vessel RV is in a problem occurrence state (Step S470), and ends the processing. Here, the problem occurrence state indicates a state where the slope $A_t$ is equal to or greater than the threshold B (that is, a state where a possibility that abnormality such as being broken occurs in the vessel RV is high) among the states of the vessel RV. When the output control unit 361 determines that the slope $A_t$ of the straight line $L_t$ is smaller than the threshold B (Step S435—YES), the output control unit 361 calculates a difference between the slope $A_{t-1}$ of the straight line $L_{t-1}$ and the slope $A_t$ of the straight line $L_t$ (Step S440).

Then, the output control unit 361 determines whether or not the difference calculated in Step S440 is smaller than a predetermined threshold α (Step S450). For example, the threshold α is 0.05 (MPa/min). The threshold α may be greater than 0.05 (MPa/min) or smaller than 0.05 (MPa/min). When the output control unit 361 determines that the difference is smaller than the threshold α (Step S450—YES), the output control unit 361 determines that the pressure state of the vessel RV is the normal state (Step S460) and ends the processing. When the output control unit 361 determines that the difference is equal to or greater than the threshold α (Step S450—NO), the output control unit 361 determines that the pressure state of the vessel RV is the problem occurrence state (Step S470) and ends the processing. When the output control unit 361 determines that the pressure state of the vessel RV is the problem occurrence state, the output control unit 361 may output an alarm by an image or a sound.

As described above, the transportation management device 30 receives the vessel information RDm from the vessel management device 10-m and displays the container freight car image VDCm in accordance with the received vessel information RDm, on the display unit 351 as the warning information. Here, in the processing (that is, processing shown in FIG. 6) described above, the transportation management device 30 changes the display state of the container freight car image VDCm in accordance with pressure information in the vessel information RDm. Thus, it is possible to provide the user with effects such as early detection of a risk of discharging the LNG from the safety valve due to the pressure increase in the vessel RVm and early detection of an explosion risk by the discharge. The transportation management device 30 displays the container freight car image VDCm at the position corresponding to the position information in the vessel information RDm. Thus, even in a case where the vessel RVm is stolen or a case where the vessel RVm is erroneously delivered or is left without being collected, it is possible to early fine the vessel RVm. Such early detection of an unknown container can prevent accidents such as an emergency emission of vaporized gas and an associated explosion.

When the above-described transportation management device 30 is a mobile terminal (in this example, tablet PC) like the transportation management device 30-2, the transportation management device 30 may capture an image of each of one or more vessel management devices 10 with a capturing unit (that is, camera) in the transportation management device 30. Thus, the transportation management device 30 may display the state of the vessel RV to which the captured vessel management device 10 is attached, on the display unit 351 using augmented reality processing or the like.

The configuration of the above-described state display image (in this example, image P1) is just an example, and the state display image may have another configuration.

When the vessel information detection unit 13 is configured to include only either the liquid level detection unit 133 or the position detection unit 137 along with the pressure detection unit 131, the vessel information includes information detected by the provided component and the pressure information detected by the pressure detection unit 131.

As described above, the transportation management system 1 includes the vessel management device (in this example, vessel management device 10) and the transportation management device (in this example, transportation management device 30) that communicates with the vessel management device. The vessel management device includes the vessel information detection unit (in this example, vessel information detection unit 13) that detects vessel information (in this example, vessel information RD) regarding a vessel of a tank container (in this example, tank container TC) which is capable of being placed in a container freight car (in this example, container freight car DC) and includes the vessel (in this example, vessel RV) capable of accommodating a liquefied natural gas and the frame body (in this example, FM) that accommodates the vessel, and the vessel management device-side communication unit (in this example, communication unit 14) that transmits the vessel information detected by the vessel information detection unit to the transportation management device. The transportation management device includes the transportation management device-side communication unit (in this example, communication unit 34) that receives the vessel information from the vessel management device, and the output control unit (in this example, output control unit 361) that outputs warning information (in this example, container freight car image VDC corresponding to each of the first dangerous state and the second dangerous state, and warning sound corresponding to each of the first dangerous state and the second dangerous state) in accordance with the vessel information received from the vessel management device to the output unit (in this example, output unit 35). Thus, in the transportation management system 1, it is possible to output warning information in accordance with vessel information regarding a vessel included in a tank container.

In the transportation management system 1, the output unit includes the display unit (in this example, display unit 351). The container-freight car position information (in this example, container freight car image VDC) being information indicating the position of the container freight car is displayed on the display unit. The output control unit performs a display on the display unit as the warning information in accordance with the vessel information received from the vessel management device based on the container-freight car position information (for example, a case where a straight line distance is set to 50 m by the route map indicated by the route map information stored in the storage unit 32, and the container-freight car moves by 50 m (the straight line distance may be longer than or shorter than 50 m)). Thus, the transportation management system 1 can visually inform the user of the state of the vessel in the tank container based on the warning information being information in which the display state of the container-freight car position information displayed on the display unit is changed.

In the transportation management system 1, the container freight car is one of freight cars pulled by a locomotive (in this example, locomotive LM) that pulls a plurality of freight cars, and the container-freight car position information indicates the position of the container freight car among the plurality of freight cars pulled by the locomotive. Thus, the transportation management system 1 can prevent the user from erroneously recognizing the state of the vessel in the tank container based on the container-freight car position information indicating the position of the container freight car among the plurality of freight cars pulled by the locomotive.

In the transportation management system 1, the output unit includes the sound output unit (in this example, sound output unit 353), and the output control unit outputs the warning sound as the warning information to the sound output unit. Thus, the transportation management system 1 can inform the user of the state of the vessel in the tank container based on the warning sound output to the sound output unit.

In the transportation management system 1, the output control unit changes the warning information to be output to the output unit in stages, in accordance with the relation between the vessel information received by the transportation management device and the plurality of predetermined output conditions (in this example, condition corresponding to the normal state, condition corresponding to the first dangerous state, and condition corresponding to the second dangerous state). Thus, the transportation management system 1 can inform the user of the state of the vessel in the tank container based on the warning information which changes in stages.

In the transportation management system 1, the vessel information detection unit includes the pressure detection unit (in this example, pressure detection unit 131) that detects the pressure in the vessel. The vessel information includes the pressure information indicating the pressure detected by the pressure detection unit. Thus, in the transportation management system 1, it is possible to output warning information in accordance with the pressure in the vessel in the tank container.

In the transportation management system 1, the vessel information detection unit includes the position detection unit (in this example, position detection unit 137) that detects the current position of the vessel. The vessel information includes the position information indicating the current position detected by the position detection unit. Thus, in the transportation management system 1, it is possible to output warning information in accordance with the current position of the vessel in the tank container, based on the current position detected by the position detection unit 137.

In the transportation management system 1, the vessel management device-side communication unit and the transportation management device-side communication unit communicate with each other by at least one of a mobile phone communication network and a track circuit communication network. Thus, in the transportation management system 1, it is possible to output warning information in accordance with the vessel information regarding the vessel in the tank container, based on the vessel management device-side communication unit and the transportation management device-side communication unit that communicate with each other by at least one of the mobile phone communication network and the track circuit communication network.

In the transportation management system 1, at least a part of portions in the vessel management device is driven with power generated by photovoltaic power generation. Thus, in the transportation management system 1, it is possible to output warning information in accordance with the vessel information detected by the vessel information detection unit driving with power generated by photovoltaic power generation.

The embodiment of the invention is described in detail with reference to the drawings. However, the specific configuration is not limited to the embodiment, and may be changed, replaced, deleted, or the like without departing front the gist of the invention.

A program for realizing the function of any component in the above-described device (for example, vessel management device 10 and transportation management device 30) may be recorded in a computer readable recording medium and may be read to a computer system and executed. It is assumed that "the computer system" herein includes an operating system (OS) and hardware such as peripheral devices. "The computer readable recording medium" refers to a portable medium such as a flexible disk, a magneto-optical disk, a ROM, a compact disk (CD)-ROM, or a storage device such as a hard disk mounted in a computer system. Further, it is assumed that "the computer readable recording medium" includes a medium that holds a program for a predetermined period, as with a volatile memory (RAM) in a computer system as a server or a client when the program is transmitted via a network such as the Internet or a communication line such as a telephone line.

The program may be transmitted from a computer system storing the program in a storage device or the like, to another computer system through a transmission medium or by a transmission wave in the transmission medium. Here, "the transmission medium" for transmitting the program refers to a medium having a function to transmit information, for example, the network (communication network) such as the Internet or the communication line such as a telephone line.

The program may be used for realizing some of the above-described functions. Further, the program may be a so-called difference file (difference program) in which the above-described functions can be realized in combination with a program recorded in the computer system.

REFERENCE SIGNS LIST

1 TRANSPORTATION MANAGEMENT SYSTEM
1-2 TRANSPORTATION MANAGEMENT SYSTEM 10, 10-1, 10-2, 10-3, 10-M VESSEL MANAGEMENT DEVICE
12, 32 STORAGE UNIT
13 VESSEL INFORMATION DETECTION UNIT
14, 34 COMMUNICATION UNIT
16, 36 CONTROL UNIT
30, 30-1, 30-2 TRANSPORTATION MANAGEMENT DEVICE
33 INPUT RECEIVING UNIT
35 OUTPUT UNIT
131 PRESSURE DETECTION UNIT
133 LIQUID LEVEL DETECTION UNIT
137 POSITION DETECTION UNIT
161 DETECTION CONTROL UNIT
163 COMMUNICATION CONTROL UNIT
351 DISPLAY UNIT
353 SOUND OUTPUT UNIT
361 OUTPUT CONTROL UNIT
363 COMMUNICATION CONTROL UNIT

The invention claimed is:

1. A transportation management system for tank containers which are allowed to be placed on a plurality of container freight cars, each of the tank containers including a vessel which is capable of accommodating liquefied natural gas and a frame body which supports the vessel, the transportation management system comprising:
a vessel management device; and
a transportation management device which is configured to communicate with the vessel management device,
wherein the vessel management device includes a vessel information detection unit which is configured to detect vessel information of the vessels included in the tank containers, and a vessel management device-side communication unit which is configured to transmit the vessel information detected by the vessel information detection unit to the transportation management device,
wherein the transportation management device includes a transportation management device-side communication unit which is configured to receive the vessel information from the vessel management device, and an output control unit which is configured to output warning information based on the vessel information received from the vessel management device, to an output unit,
wherein the output unit includes a display unit on which container-freight car position information indicating where the container freight cars are positioned is displayed,
wherein the output control unit is configured to generate container freight car images, indicating the container freight cars and display an integrated image, in which the container freight car images are arranged so as to replicate an actual sequence of the plurality of container freight cars, on the display unit with a traveling direction information of the container freight cars, and
wherein the output control unit is configured to change a display state of the integrated image as the warning information displayed on the display unit, the warning information includes the container-freight car position information, based on the vessel information received from the vessel management device.

2. The transportation management system according to claim 1, wherein the output unit includes a sound output unit, and
the output control unit is configured to output a warning sound as the warning information to the sound output unit.

3. The transportation management system according to claim 1, wherein the output control unit is configured to change the warning information to be output to the output unit, in stages, in accordance with a relation between the vessel information received by the transportation management device and a plurality of predetermined output conditions.

4. The transportation management system according to claim 1, wherein the vessel information detection unit includes a pressure detection unit which is configured to detect pressure in the vessel, and the vessel information includes pressure information indicating the pressure detected by the pressure detection unit.

5. The transportation management system according claim 1, wherein the vessel information detection unit includes a position detection unit which is configured to detect a current position of the vessel, and
the vessel information includes position information indicating the current position detected by the position detection unit.

6. The transportation management system according to claim 1, wherein the vessel management device-side communication unit and the transportation management device-side communication unit communicate with each other by at least one of a mobile phone communication network and a track circuit communication network.

7. The transportation management system according to claim 1, wherein at least a. part of portions in the vessel management device is driven with power generated by photovoltaic power generation.

8. A transportation management device for communicating with a vessel management device including a vessel information detection unit which is configured to detect vessel information of vessels included in tank containers and a vessel management device-side communication unit which is configured to transmit the vessel information detected by the vessel information detection unit, wherein the tank containers are allowed to be placed on a plurality of container freight cars, each of the tank containers including one of the vessels. each vessel being capable of accommodating liquefied natural gas and a frame body which supports the vessel, the transportation management device comprising:
a transportation management device-side communication unit which is configured to receive the vessel information from the vessel management device-side communication unit; and
an output control unit which is configured to output warning information based on the vessel information received from the vessel management device, to an output unit,
wherein the output unit includes a display unit on which container-freight car position information indicating where the container freight cars are positioned is displayed,
wherein the output control unit is configured to generate container freight car images indicating the container freight cars and display an integrated image, in which the container freight car images are arranged so as to replicate an actual sequence of the plurality of container freight cars, on the display unit with a traveling direction information of the container freight cars, and
wherein the output control unit is configured to change a display state of the integrated image as the warning information displayed on the display unit. the warning information includes the container-freight car position information, based on the vessel information received from the vessel management device.

9. The transportation management device according to claim 8, wherein the output control unit generates a graph representing a change of pressure of the vessel with a change of time based on the vessel information and displays an image of the generated graph on a display unit included in the output unit.

\* \* \* \* \*